US011376978B1

(12) United States Patent
Peeler et al.

(10) Patent No.: US 11,376,978 B1
(45) Date of Patent: Jul. 5, 2022

(54) ESTABLISHING AN ELECTRICAL CONNECTION BETWEEN A CHARGING STATION AND A VEHICLE BY EXTENDING A RECEIVER FROM THE CHARGING STATION AND BENEATH THE VEHICLE

(71) Applicant: Mod.al, Draper, UT (US)

(72) Inventors: Kreg Peeler, Draper, UT (US); Preston Ruff, Draper, UT (US); Erick Vega, Salt Lake City, UT (US); Bruce Cain, South Jordan, UT (US)

(73) Assignee: Mod.al Group, Inc., American Fork, UT (US)

( * ) Notice: Subject to any disclaimer, the term of this patent is extended or adjusted under 35 U.S.C. 154(b) by 0 days.

(21) Appl. No.: 17/380,938

(22) Filed: Jul. 20, 2021

(51) Int. Cl.
*B60L 53/35* (2019.01)
*B60L 53/14* (2019.01)

(52) U.S. Cl.
CPC .............. *B60L 53/35* (2019.02); *B60L 53/14* (2019.02)

(58) Field of Classification Search
CPC .......... B60L 53/14; B60L 53/35; B60L 53/36; B60L 53/37; B60L 53/38; B60L 53/39
USPC ......................................................... 320/109
See application file for complete search history.

(56) References Cited

U.S. PATENT DOCUMENTS

| | | | | |
|---|---|---|---|---|
| 9,925,883 B2* | 3/2018 | Bell | ........................ | B60L 53/36 |
| 10,562,405 B2* | 2/2020 | Penney | ................. | H01M 10/44 |
| 10,625,612 B2* | 4/2020 | Cyr | ........................ | B60L 53/12 |
| 10,870,364 B2* | 12/2020 | Mere | ....................... | B60L 53/14 |
| 10,933,758 B2* | 3/2021 | Tanaka | ................. | B60L 53/37 |
| 10,988,042 B1* | 4/2021 | Chase | ..................... | B60L 53/38 |
| 11,088,574 B2* | 8/2021 | Niwa | .................... | H02J 7/0047 |
| 11,130,412 B2* | 9/2021 | Boecker | ............... | H02J 7/0042 |
| 11,130,418 B2* | 9/2021 | Lewis | .................... | B60L 53/36 |
| 11,130,419 B2* | 9/2021 | Lin | ..................... | H02J 7/00034 |
| 11,142,083 B2* | 10/2021 | Su | ........................... | B60L 53/38 |
| 11,161,425 B2* | 11/2021 | Daminelli | .............. | B60L 53/30 |
| 2021/0129696 A1* | 5/2021 | Westfall | ................. | B60L 53/35 |

* cited by examiner

*Primary Examiner* — Nathaniel R Pelton
(74) *Attorney, Agent, or Firm* — Kirton McConkie; Brian Tucker

(57) ABSTRACT

A control system of a charging station can automatically and intelligently connect to and charge an electric vehicle's battery or otherwise provide power to a component of a vehicle. The control system can be configured to detect the position of an onboard unit on a vehicle and automatically maneuver a receiver underneath the onboard unit. The control system can then cause the onboard unit to extend and plug into the receiver. The control system can then deliver power via the receiver and onboard unit.

23 Claims, 19 Drawing Sheets

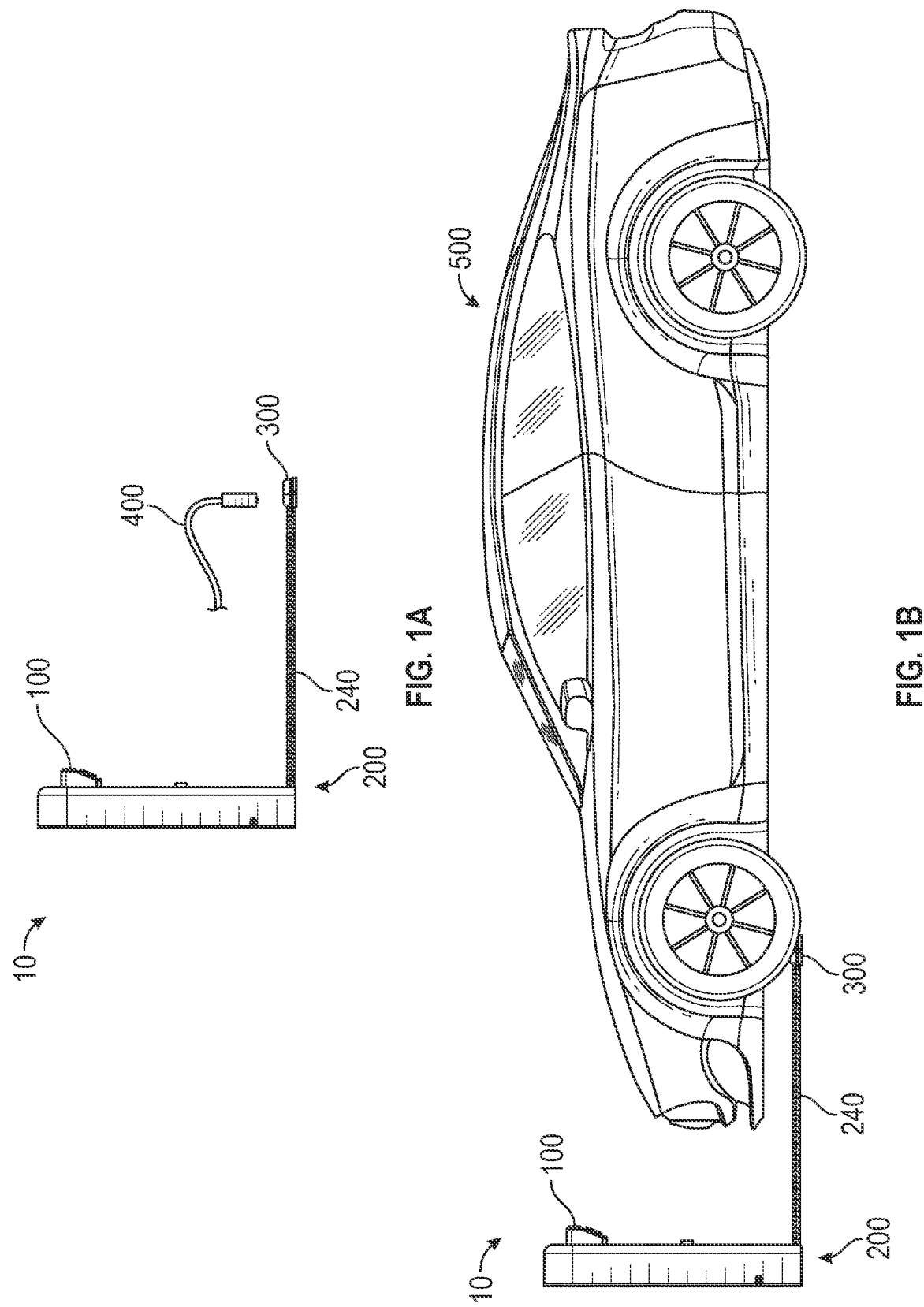

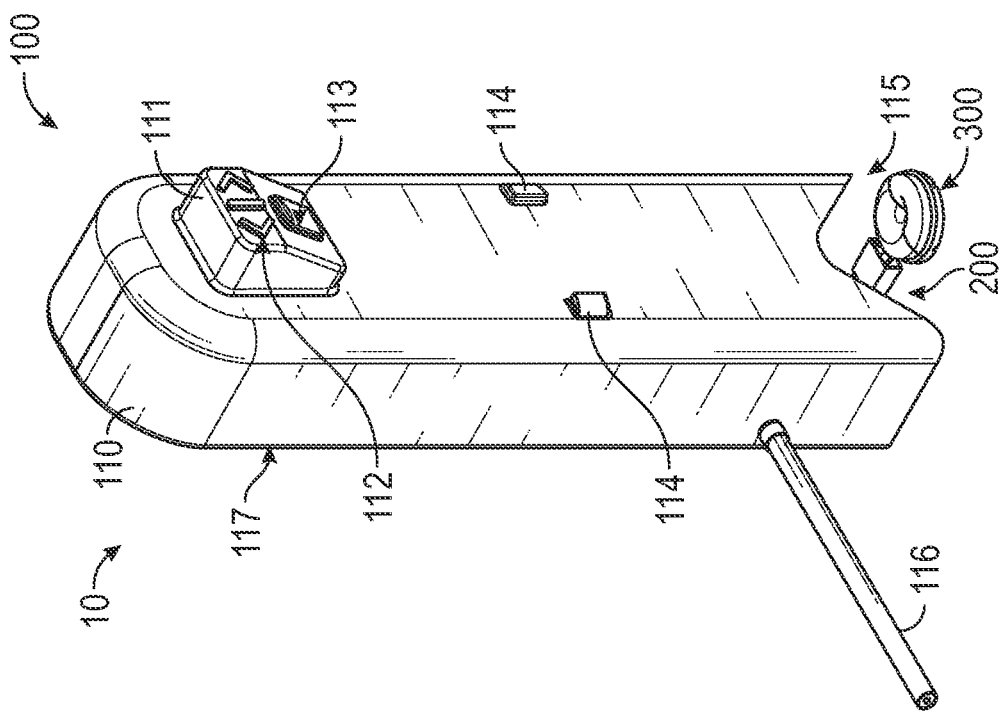
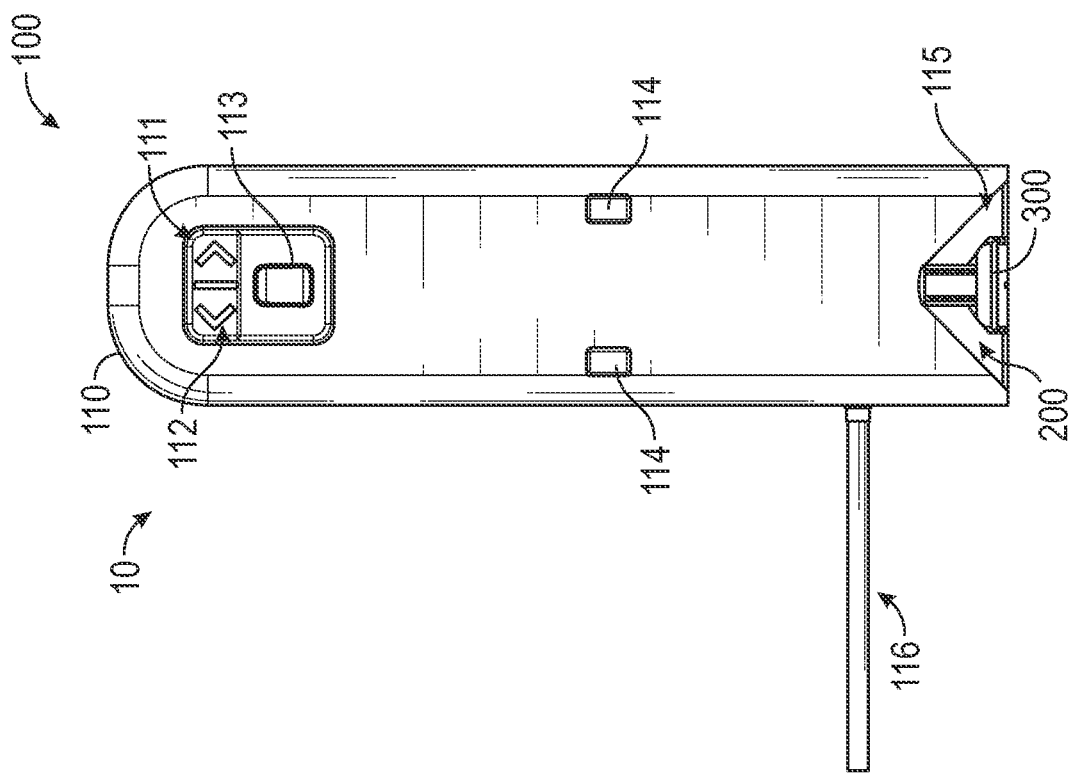

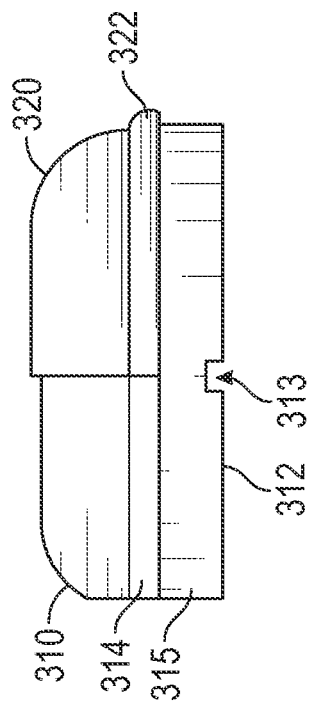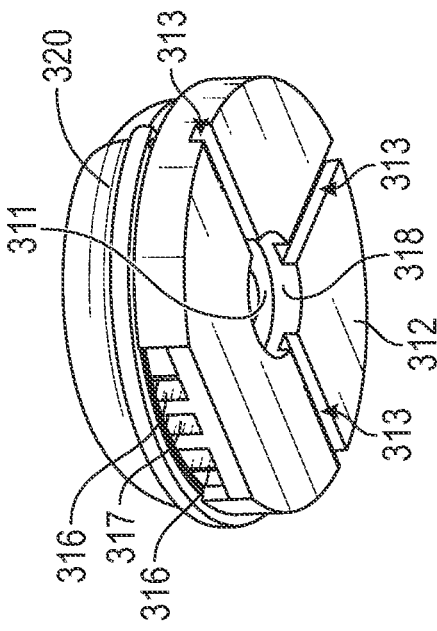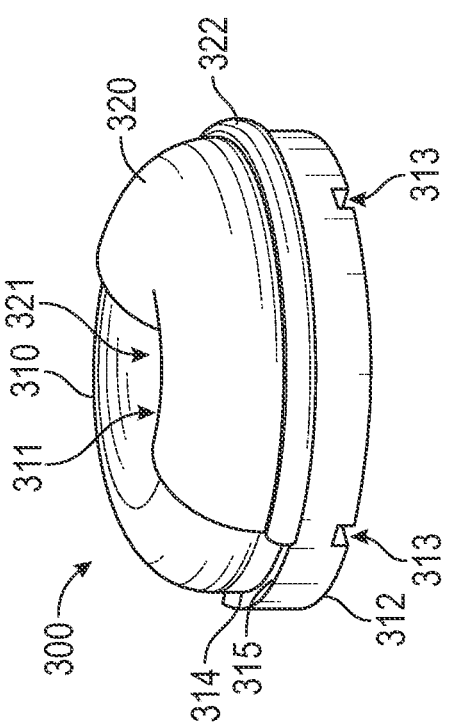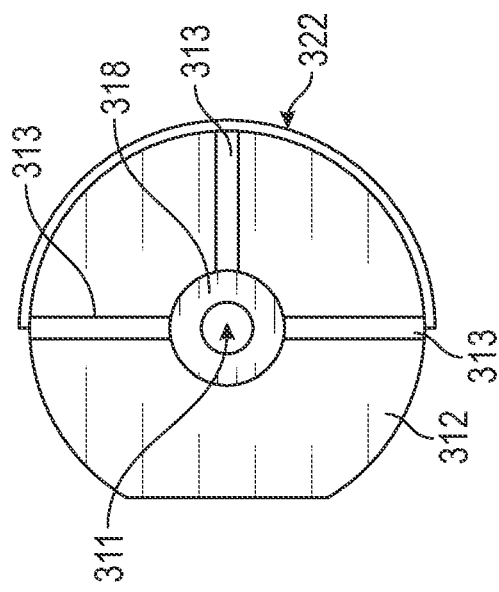

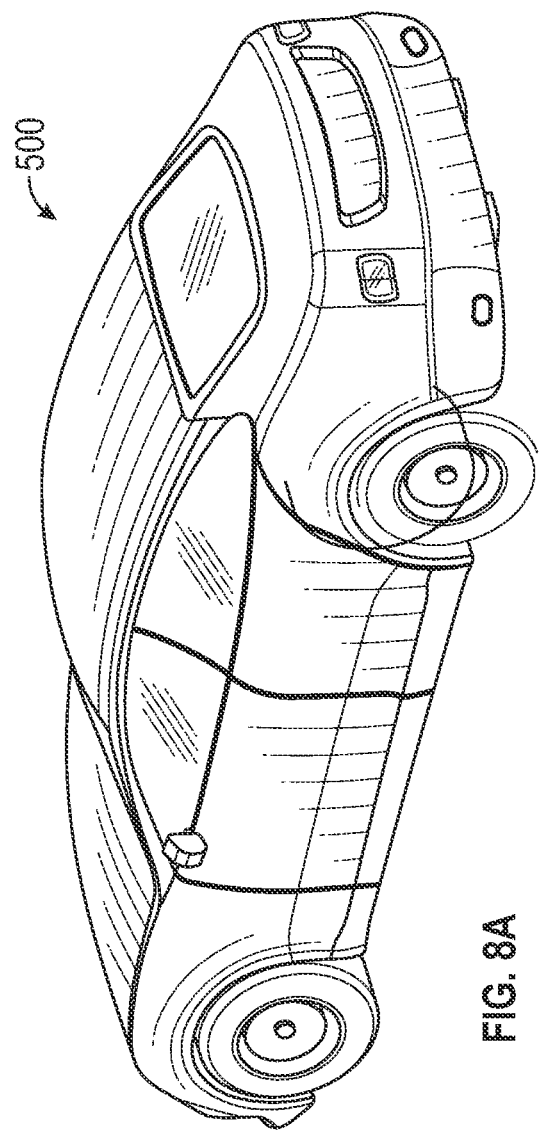
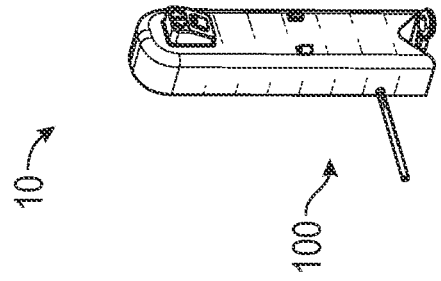
1. Charging station 10 detects that EV 500 is approaching
FIG. 8A

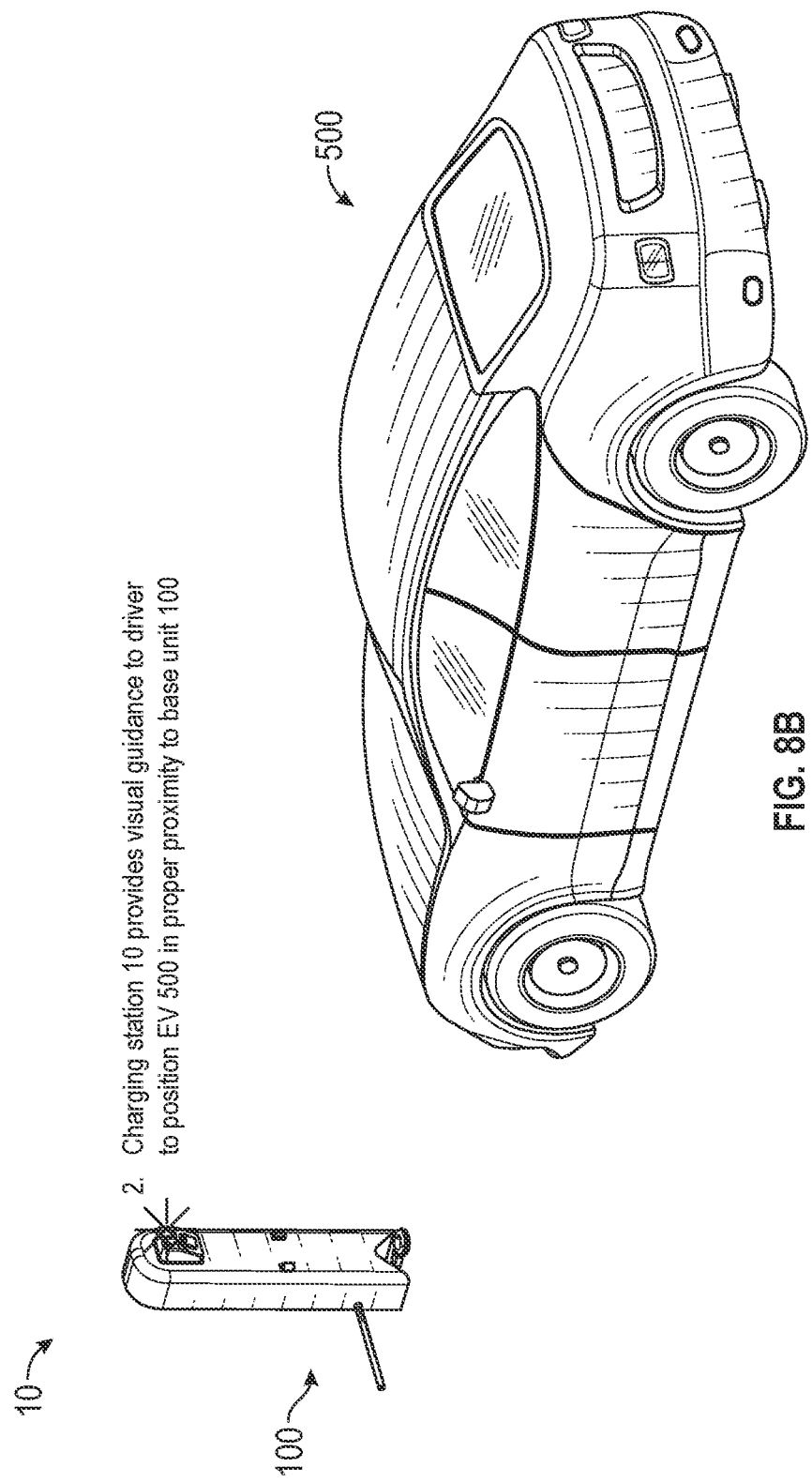

ESTABLISHING AN ELECTRICAL CONNECTION BETWEEN A CHARGING STATION AND A VEHICLE BY EXTENDING A RECEIVER FROM THE CHARGING STATION AND BENEATH THE VEHICLE

CROSS-REFERENCE TO RELATED APPLICATIONS

N/A

BACKGROUND

Electrical vehicles (or EVs), whether cars, trucks or otherwise, must be frequently recharged. For this purpose, an EV typically has a charging port that is located on the side of the vehicle. In such cases, to charge the EV, a driver must exit the EV and plug a cord into the charging port.

Some attempts have been made to develop automated charging solutions. For example, some solutions employ a robotic arm that plugs the charging cord into the charging port. These solutions are bulky, expensive and obstruct the pathway around the EV. Other solutions employ induction to wirelessly charge the EV. Such solutions are complex and often require significant structural investments/modifications such as embedding an inductive plate in the concrete, asphalt or other base material. Wireless solutions are also incapable of performing level 3 "rapid" charging.

Because of such complexities, cost and limitations, automated charging solutions have not been widely adopted. Instead, the vast majority of EV owners simply plug in their EVs just like any other electronic device.

BRIEF SUMMARY

The present invention extends to a control system for a charging station that enables the charging station to automatically and intelligently connect to and charge an electric vehicle's battery or otherwise provide power to a component of a vehicle, and to corresponding systems, methods and computer program products. A control system of a charging station can be configured to detect the position of an approaching vehicle and provide guidance to ensure that the vehicle is parked in a location where its onboard unit will be within reach of a receiver of the charging station. The control system can also be configured to detect a position of the onboard unit relative to the receiver so that the receiver can be maneuvered into alignment with the onboard unit. The control system can be further configured to extend the onboard unit to cause it to plug into the receiver once the receiver is in alignment with the onboard unit. The control system can then cause power to be delivered via the receiver and onboard unit to charge the vehicle's battery or otherwise provide power to a component of the vehicle.

In some embodiments, the present invention may be implemented as a method for connecting a vehicle to a charging station. A receiver cam be maneuvered beneath a vehicle that includes an onboard unit. The onboard unit can then be extended to establish an electrical connection with the receiver.

In some embodiments, the present invention may be implemented as a method for connecting a vehicle to a charging station. It can be detected that a vehicle is approaching the charging station. A position of an onboard unit on the vehicle can be determined. Guidance can be provided to a driver of the vehicle based on the position of the onboard unit on the vehicle and a position of the vehicle relative to the charging station.

In some embodiments, the present invention may be implemented as a method for connecting a vehicle to a charging station. A type of an approaching vehicle can be detected. Based on the detected type, a position of an onboard unit on the vehicle can be determined. Guidance can be provided to a driver of the vehicle based on the determined position of the onboard unit to thereby assist the driver in parking the vehicle with the onboard unit within range of a receiver.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 1A and 1B provide an example of a charging station with which a control system configured in accordance with one or more embodiments of the present invention may be used;

FIGS. 2A and 2B are front and front perspective views respectively of a base unit of the charging station;

FIGS. 6A-6F are views of a receiver of a charging station with which a control system configured in accordance with one or more embodiments of the present invention may be used;

FIGS. 8A-8E provide an example of how a control system configured in accordance with one or more embodiments of the present invention may control a charging station to automatically connect to and charge an electric vehicle's battery;

DETAILED DESCRIPTION

Figure 3C:
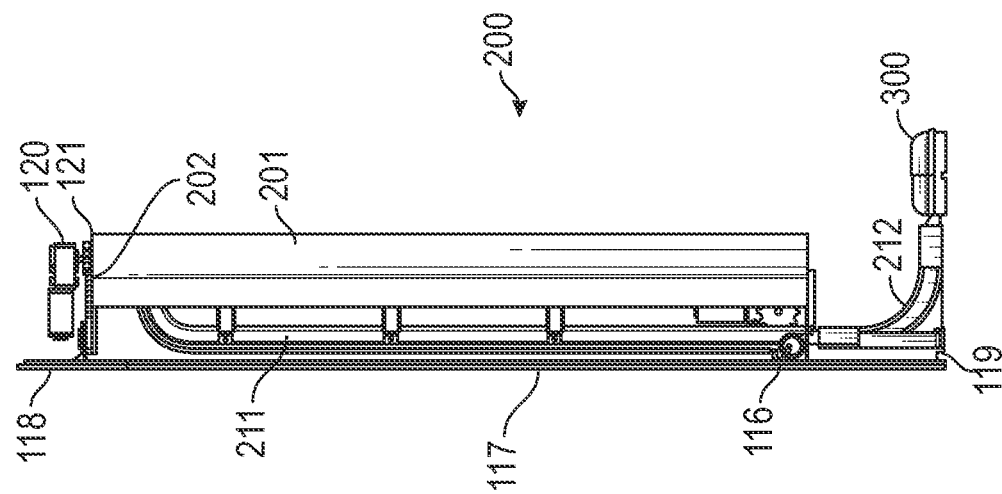
FIGS. 3A-3C are front, front perspective and side views respectively of the base unit with a housing removed thereby showing a containment assembly.
Figure 3B:
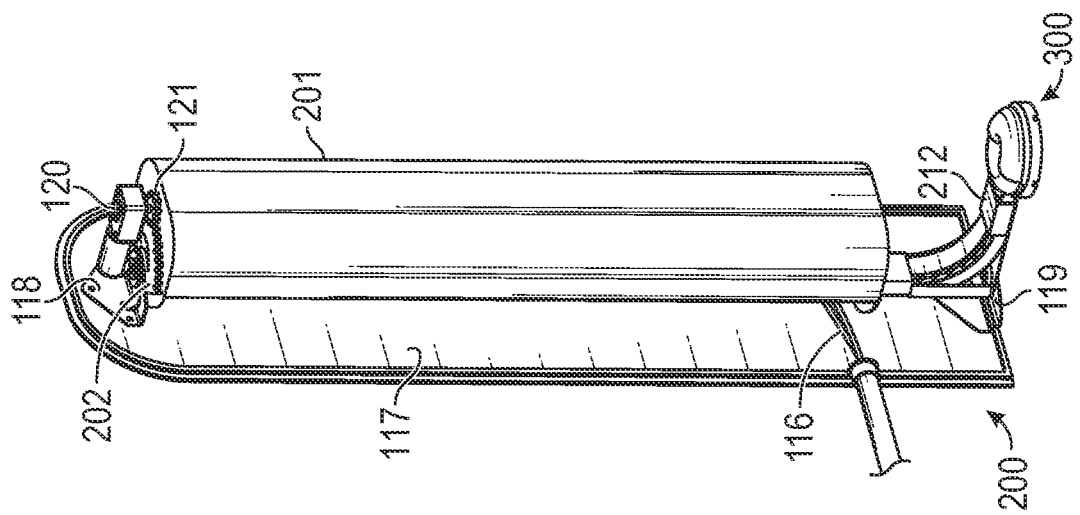
Figure 3A:
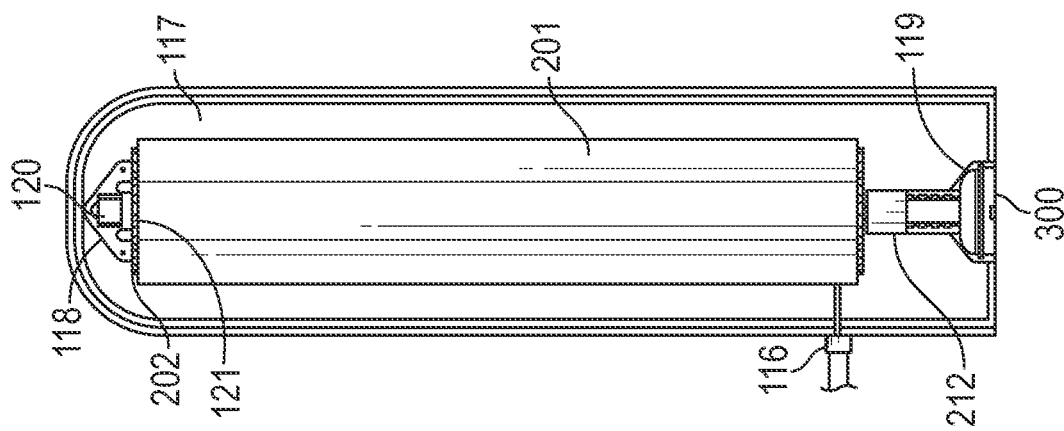

Embodiments of the present invention encompass a control system that may be used in charging stations to enable the charging stations to automatically and intelligently connect to and charge an electric vehicle's (EV's) battery or to otherwise provide power to a component of a vehicle. Prior to describing embodiments of a control system, embodiments of a charging station with which the control system can be used will be described. However, it is to be understood that a control system configured in accordance with one or more embodiments of the present invention may be used with other charging stations. Therefore, the present invention should not be limited to the charging stations shown in the figures or described herein.

A charging station that may include a control system configured in accordance with one or more embodiments of the present invention may include a base unit that is capable of maneuvering a receiver underneath an EV to position the receiver below an onboard unit that is electrically connected to the EV's battery. The control system can then cause the onboard unit to extend into the receiver to electrically couple the onboard unit to the receiver. When it detects that the receiver is electrically coupled to the onboard unit, the control system can cause the base unit to supply power to the EV via the receiver and the onboard unit. In the specification and the claims, the phrase "electrically connected to an electric vehicle's battery" should be construed as encompassing direct and indirect connections. For example, an onboard unit may be electrically connected to an electric vehicle's battery via an onboard DC charger or a battery service panel.

FIG. 1 provides an example of a charging station 10 that may include a control system that is configured in accordance with one or more embodiments of the present invention when charging station 10 is used to charge a battery of an EV 500. FIG. 1A shows charging station 10 without EV 500. Charging station 10 can include a base unit 100, a containment assembly 200, which is shown in FIGS. 3A-3E and includes an extender 240, and a receiver 300. An onboard unit 400 can be included on or added to EV 500 to enable EV 500 to be connected to charging station 10.

FIGS. 2A and 2B illustrate base unit 100 when extender 240 is retracted. Base unit 100 may include a housing 110 in which a containment assembly 200 is housed. In some embodiments, a back panel 117 may be separate from housing 110. In some embodiments, housing 110 may form a front compartment 111 in which one or more visual indicators 112 are disposed. In the depicted embodiment, visual indicators 112 include left and right arrows for guiding a driver of EV 500 as he or she approaches base unit 110 and a proper positioning indicator (e.g., a vertical green bar) for notifying the driver when EV 500 is properly positioned relative to base unit 110. However, visual indicators 112 could be in any form capable of providing visual guidance to the driver. In some embodiments, base unit 100 may not include visual indicators 112 such as when the control system of charging station 10 is configured to interface with an autonomous EV for purposes of parking the EV in a proper position relative to base unit 100.

To enable the control system of charging station 10 to provide visual guidance to the driver, base unit 110 may include one or more sensors. For example, in the depicted embodiment, an upper sensor 113 is positioned in front compartment 111 and is angled downwardly so that it will be oriented towards EV 500 as it approaches, while lower sensors 114 are positioned on opposing sides of base unit 110 and may be positioned to generally correspond with the height of EV 500's bumper. Based on signals from upper sensor 113 and/or lower sensors 114 (or any other suitable sensors), the control system can determine whether EV 500 is too far to the right or left of base unit 100 and/or is near enough to base unit 100 and can activate visual indicators 112 accordingly. As described in detail below, although EV 500 need not be in a specific position to connect to base unit 100, the control system can use visual indicators 112 to ensure that the driver positions EV 500 within the range of extender 240 (e.g., within the left and right boundaries of extender 240's pivoting range).

Base unit 100 may include a bottom opening 115 that may be frontwardly oriented and functions to enable the control system to extend extender 240 from and retract extender 240 into base unit 100 while extender 240 is on the floor (or ground). For example, once EV 500 is in proper position relative to base unit 100, the control system can slide extender 240 within bottom opening 115 and along the floor to position receiver 300 below onboard unit 400. In some embodiments, the control system can be configured to fully retract extender 240 into base unit 100 so as to protect it from weather, human and animal interaction, damage, etc.

Base unit 100 may also receive a cable (or cord) 116 by which power is supplied to base unit 100. For example, when charging station 10 is installed in a private home, cable 116 could be plugged into a home's electrical system. Similarly, when charging station 10 is used at a business location, a gas station, a bus depot, a parking garage or any other location, cable 116 could represent base unit 100's connection to a power source. In addition to what is shown, cable 116 could extend into or connected to base unit 100 in any suitable way such as from beneath base unit 100.

FIGS. 3A-3E show base unit 100 with housing 110 removed. In some embodiments, back panel 117 can function to support containment assembly 200 in an upright orientation. However, containment assembly 200 could have a horizontal orientation or any other suitable orientation, and therefore, base unit 100 could have a variety of shapes and/or sizes for housing containment assembly 200.

In the depicted embodiment, an upper pivot bracket 118 is secured near the top of back panel 117 and a lower pivot bracket 119 is secured near the bottom of back panel 117. Containment assembly 200 may be supported between upper pivot bracket 118 and lower pivot bracket 119 to thereby enable the control system to pivot containment assembly 200 back and forth. This pivoting allows receiver 300 to be slid side-to-side underneath EV 500 as necessary to position receiver 300 below onboard unit 400.

In some embodiments, containment assembly 200 may include a containment housing 201 on which a rotating gear 202 is mounted or coupled. In the depicted embodiment, rotating gear 202 is positioned on top of containment housing 201. In other embodiments, rotating gear 202 could be positioned on the bottom of containment housing 201, or rotating gears 202 could be positioned on both the top and the bottom of containment housing 201. Base unit 100 may include a motor 120 which drives a pivot drive gear 121 which in turn drives rotating gear 202 to cause containment assembly 200 to pivot. The control system of charging station 10 may control motor 120 as part of maneuvering receiver 300 into position below onboard unit 400.

Figure 3D:
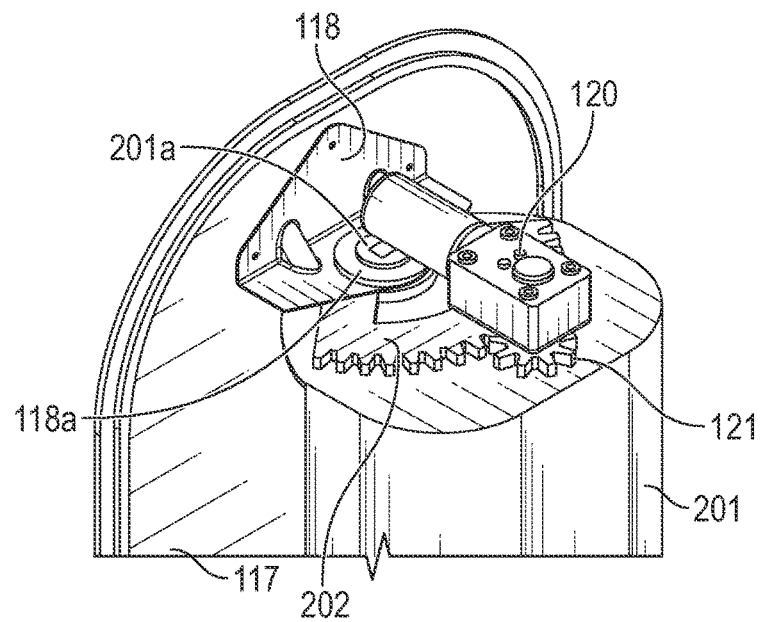
FIGS. 3D and 3E are detailed views of a top portion and a bottom portion respectively of the containment assembly.

As is best shown in FIG. 3D, the top surface of containment housing 201 may include a protrusion 201a that inserts through an opening 118a in upper pivot bracket 118 to secure containment assembly 200 to back panel 117. Protrusion 201a and opening 118a may be circular to enable containment housing 201, and therefore containment assembly 200, to rotate relative to upper pivot bracket 118. The axis of rotating gear 202 may be aligned with protrusion 201a.

Figure 3E:
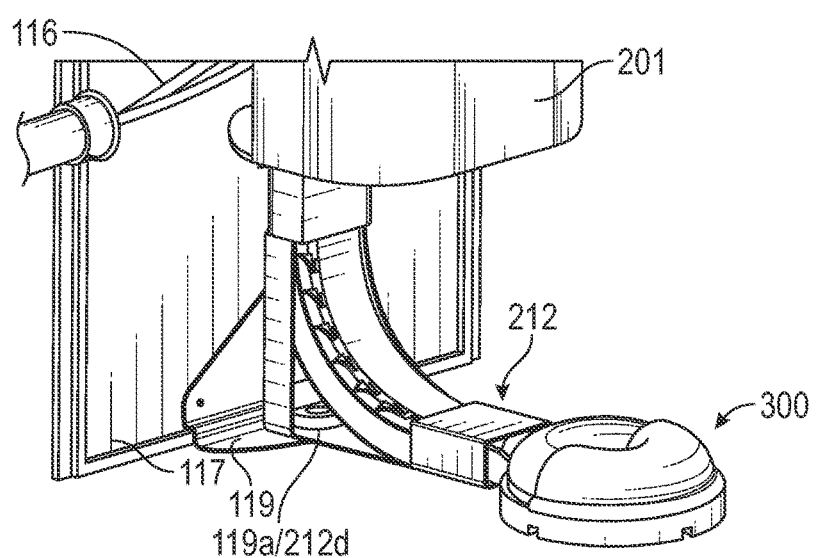

As best seen in FIG. 3E, a floor guide 212 of an extender assembly 210 may extend downwardly from containment housing 201 and may interface with lower pivot bracket 119 to secure containment assembly 200 to back panel 117. In the depicted embodiment, floor guide 212 includes a recess 212d into which a protrusion 119a of lower pivot bracket 119 inserts. Recess 212d and protrusion 119a can be circular to enable floor guide 212, and therefore containment assembly 200, to rotate relative to lower pivot bracket 119.

Figure 4C:
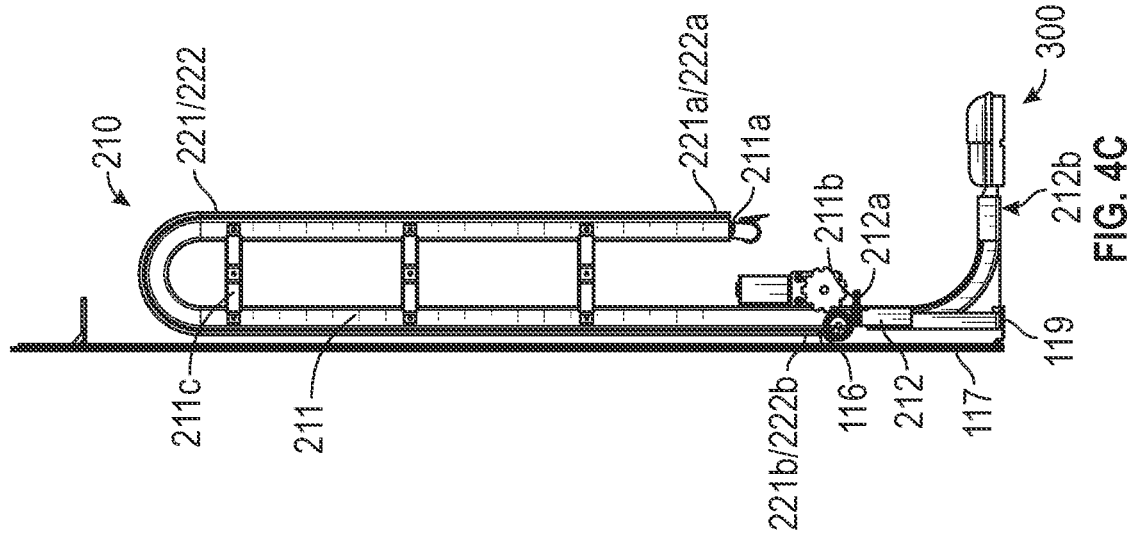
FIGS. 4A-4C are front, front perspective and side views respectively of the containment assembly with a containment housing removed thereby showing an extender assembly.
Figure 4B:
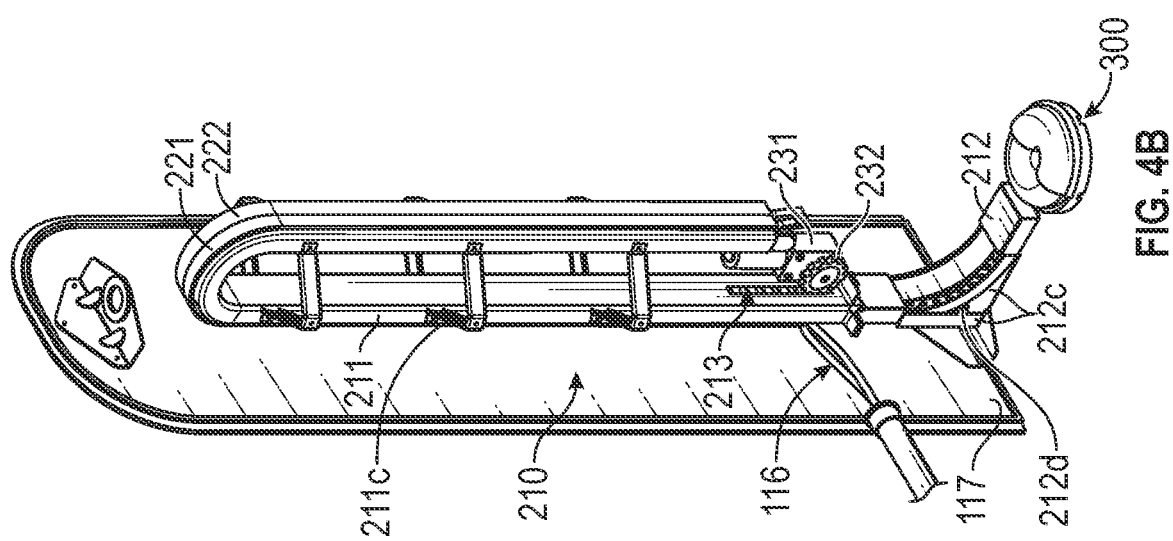
Figure 4A:
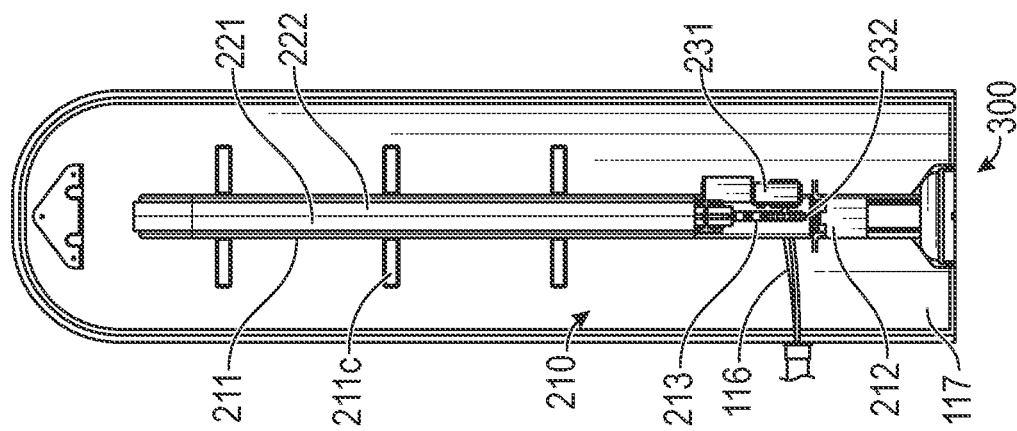

FIGS. 4A-4C show base unit 100 with housing 110 and containment housing 201 removed. As shown, extender assembly 210 can be substantially contained within containment housing 201. Extender assembly 210 can include an internal guide 211 and floor guide 212 which function as a guide for extender 240. Although internal guide 211 and floor guide 212 will be described as being two separate components, in some embodiments, these guides could be formed of a single component or more than two components. Accordingly, in some embodiments, floor guide 212 may be considered the portion of the guide for extender 240 which directs extender 240 onto the floor, and internal guide 211 can be considered the remaining portion of the guide for extender 240. To distinguish between opposite ends of components of extender assembly 210, the term "distal" will be used to reference the end of a component that is towards receiver 300 and the term "proximal" will be used to reference the opposite end.

Internal guide 211 and floor guide 212 can be hollow to form a pathway along which extender 240 may slide. In the depicted embodiment, internal guide 211 and floor guide 212 have a generally rectangular cross-sectional shape. This rectangular cross-sectional shape can facilitate the use of an extender 240 having a rectangular cross-sectional shape which in turn allows extender 240 to lie flat on the floor. However, internal guide 211 and floor guide 212 could have another cross-sectional shape such as a circular shape, an oval shape, a triangular shape, etc. which may accommodate an extender 240 having any suitable cross-sectional shape.

Floor guide 212 may have a curved shape to cause extender 240 to transition from a vertical orientation to a horizontal orientation. For example, a proximal end 212a of floor guide 212 may be vertically oriented alongside back panel 117 and a distal end 212b of floor guide 212 may be horizontally oriented to extend along the floor at or through bottom opening 115 of base unit 100. Accordingly, floor guide 212 may form a curved pathway for extender 240. To facilitate securing floor guide 212 to lower pivot bracket 119, floor guide 212 may include vertical and horizontal extensions 212c that form a corner at which recess 212d may be positioned.

Internal guide 211 may include a distal end 211b that is connected or positioned adjacent to proximal end 212a of floor guide 212. Distal end 211b may be downwardly oriented to align with proximal end 212a to enable extender 240 to slide therebetween. Internal guide 211 may extend upwardly and then curve overtop itself such that proximal end 211a of internal guide 211 is also downwardly oriented. Accordingly, internal guide 211 may have an inverted U shape. In some embodiments, one or more brackets 211c may be connected between the opposing lengths of internal guide 211 to prevent the opposing lengths from moving relative to one another and/or to provide support.

In some embodiments, internal guide 211 could be curved overtop itself more than once to facilitate the use of a longer extender 240. Also, in some embodiments, internal guide 211 need not be curved overtop itself. For example, if base unit 100 is sufficiently tall, internal guide 211 may consist of a single vertical length. In any case, curving internal guide 211 within base unit 100 can enable base unit 100 to be more compact while still enabling the use of an extender 240 with a length that is longer than the height or other dimension of base unit 100.

Extender 240 may be positioned within internal guide 211 and floor guide 212. To cause extender 240 to slide within internal guide 211 and floor guide 212, the control system may use a motor 231 to drive an extender drive gear 232 which in turn may interface with extender 240 to convert rotational motion into linear movement of extender 240. For example, in the depicted embodiments, an opening 213 is formed through internal guide 211. Extender drive gear 232 may extend through opening 213 to contact extender 240 so that, as extender drive gear 232 rotates, extender 240 will be extended from or retracted into floor guide 212. Motor 231 and extender drive gear 232 may be mounted to containment assembly 200 so that they pivot with containment assembly 200 and remain aligned with opening 213.

Extender assembly 210 may also include a pair of power rails 221, 222 that may extend along at least a portion of internal guide 211 and possibly along a portion of floor guide 212. In the depicted embodiment, proximal ends 221a, 222a of power rails 221, 222 extend to proximal end 211a of internal guide 211, and distal ends 221b, 222b of power rails 221, 222 extend towards distal end 211 of internal guide 211 where they may be connected to the individual wires/leads of cable 116.

Figure 5:
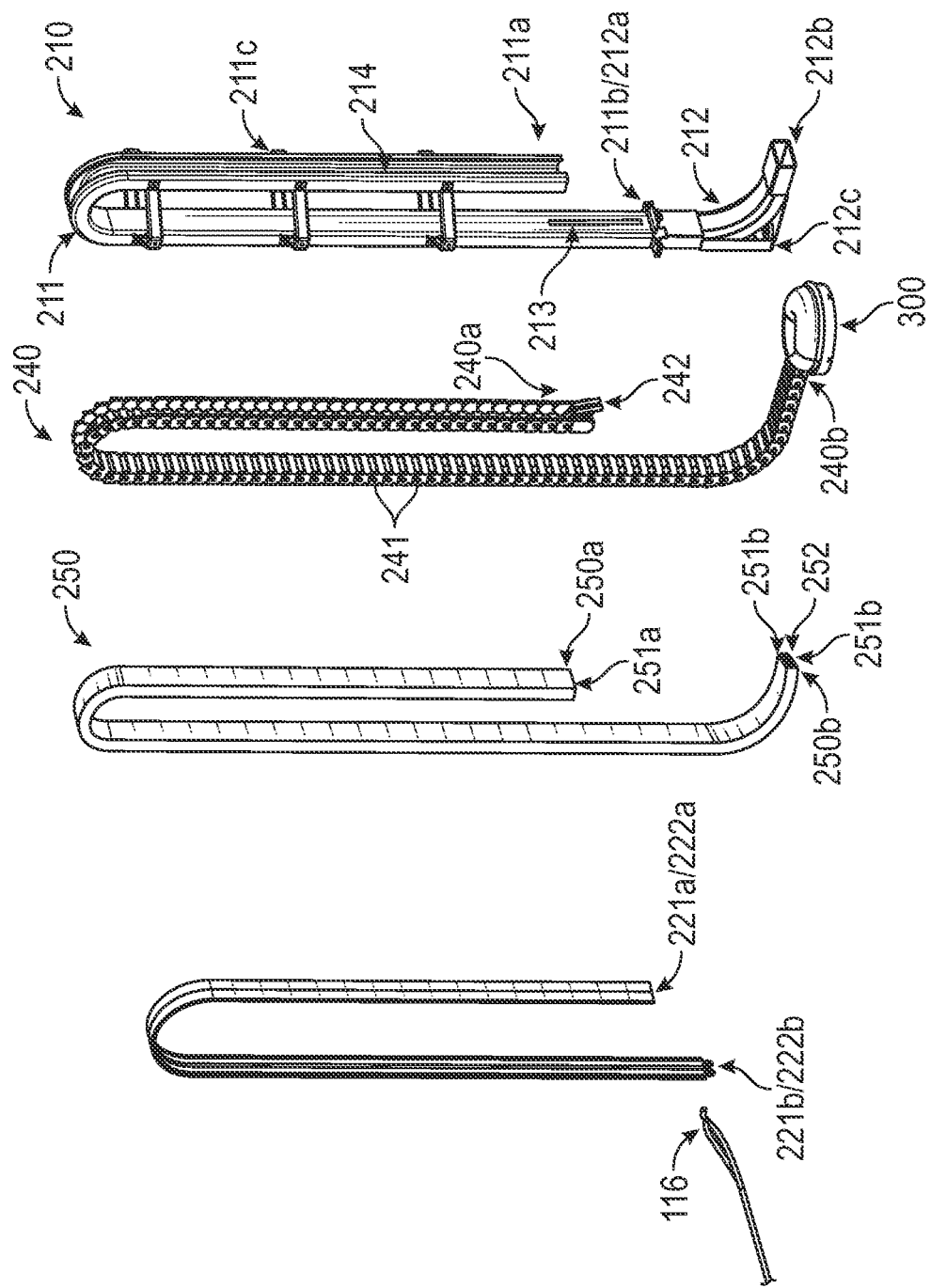
FIG. 5 is an exploded view of the extender assembly.
Figure 6E:
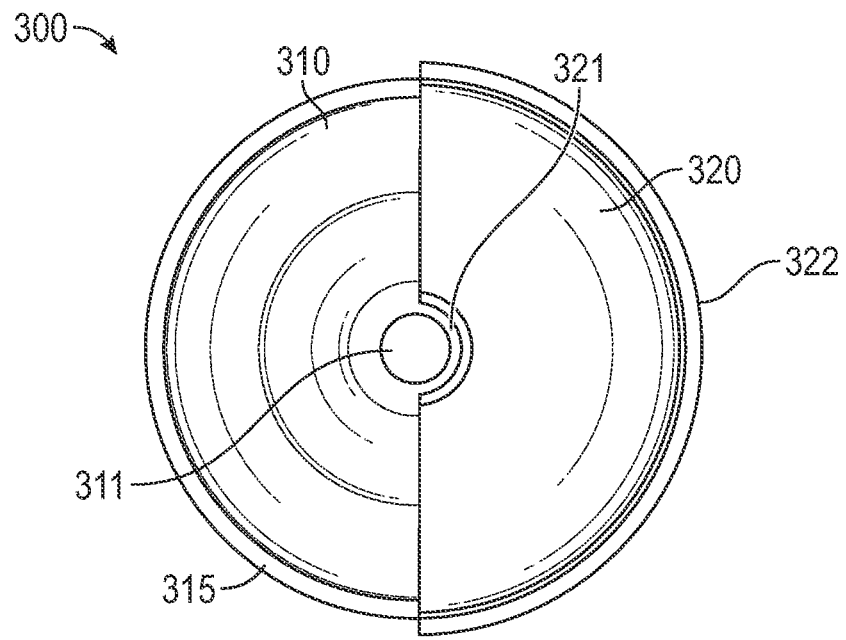
Figure 6F:
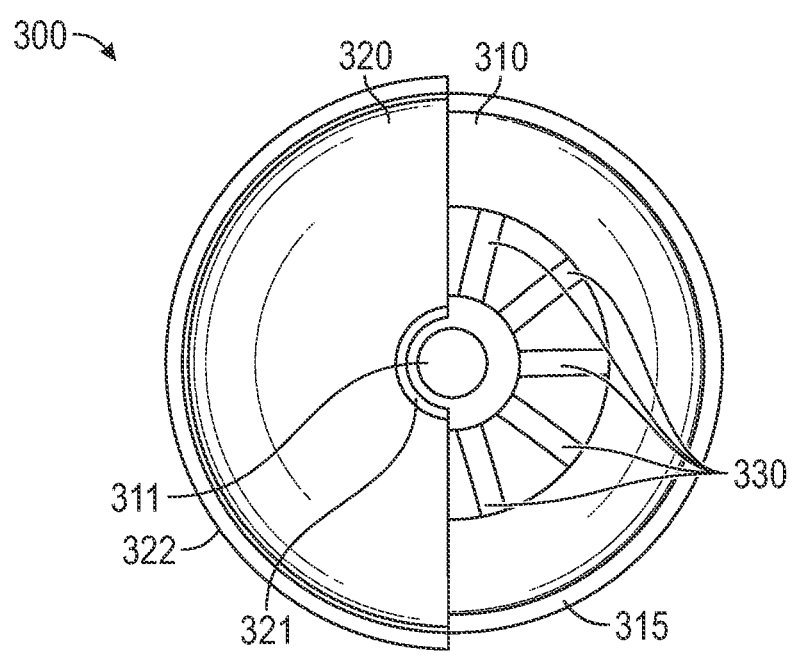
Figure 7C:
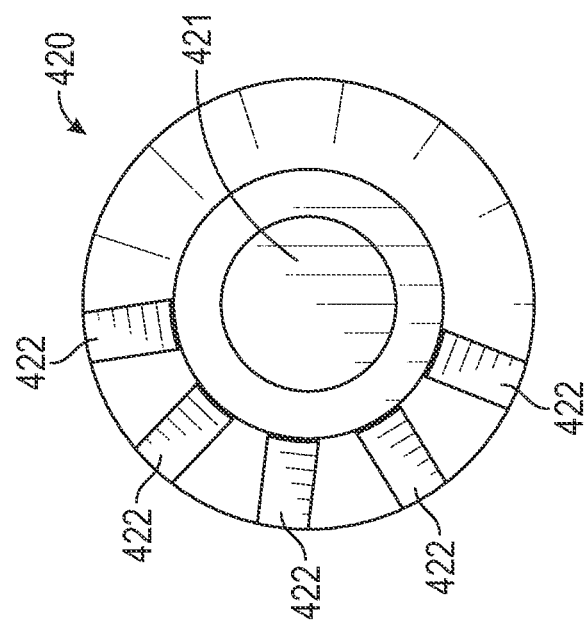
FIGS. 7A-7E are various views of an onboard unit of a charging station with which a control system configured in accordance with one or more embodiments of the present invention may be used.
Figure 7B:
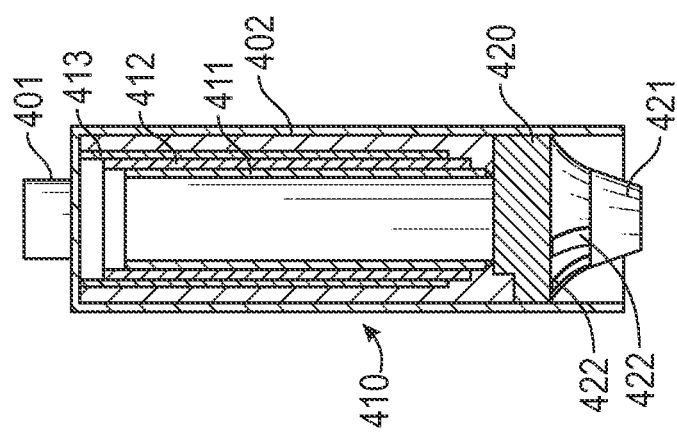
Figure 7A:
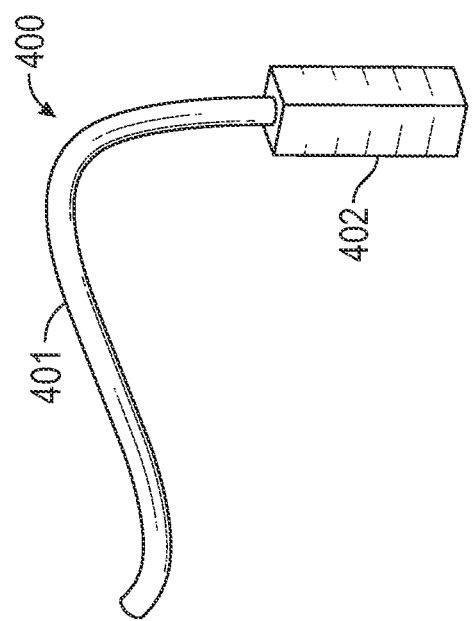
Figure 7D:
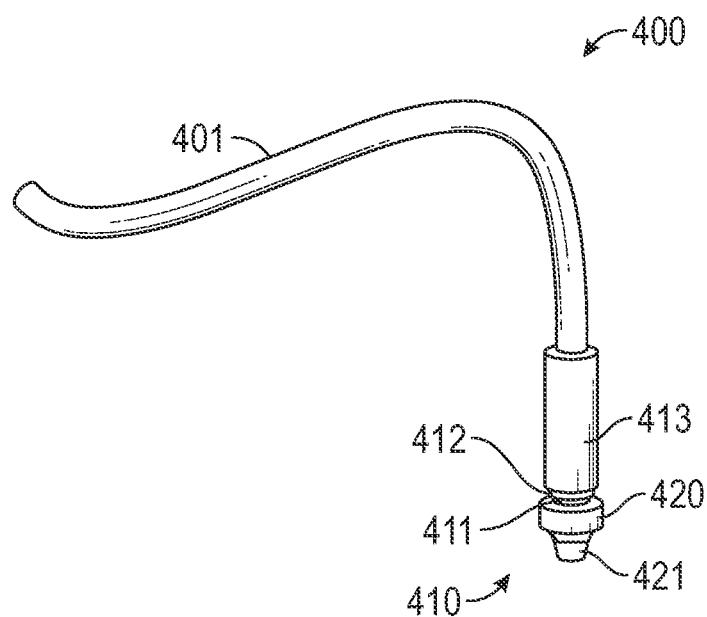
Figure 7E:
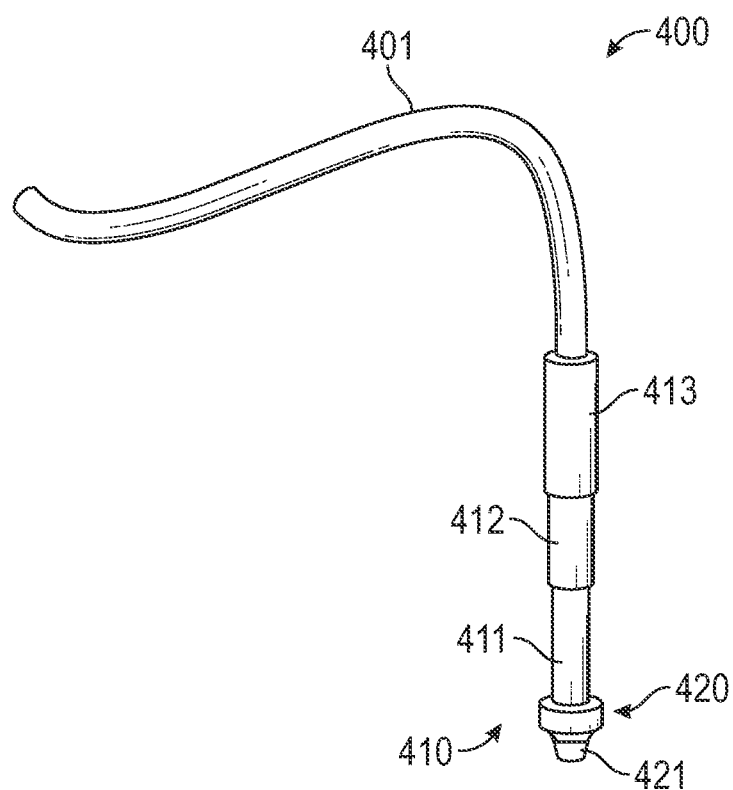

FIG. 5 provides an exploded view of extender assembly 210. As shown, a channel 214 may be formed along at least a portion of internal guide 211 and possibly along a portion of floor guide 212, and power rails 221, 222 may be positioned overtop channel 214. Power rails 221, 222 may include a conductive inner surface (e.g., copper plating) that is positioned within or faces channel 214. Extender 240 may include contacts 242 that extend out through channel 214 or otherwise contact the conductive inner surface of the respective power rails 221, 222. In the depicted embodiment, a pair of contacts 242 are formed at a proximal end 240a of extender 240. However, contacts 242 could be formed at other locations of extender 240. As extender 240 is slid within internal guide 211 and floor guide 212, contacts 242 can slide within channel 214 and remain in contact with power rails 221, 222. In this way, power supplied via cable 116 can be delivered to receiver 300 via extender 240 regardless of the extent to which receiver 300 may be extended from base unit 100.

In some embodiments, extender 240 may be formed of a plurality of interconnected articulating members 241. For example, articulating members 241 could be links of a chain. In some embodiments, articulating members 241 may have a rectangular shape so that they lie flat on the floor. However, articulating members 241 could have another suitable shape. Extender drive gear 232 may be configured to insert between articulating members 241 to extend and retract extender 240.

Extender assembly 210 may include a cable 250 that is configured to fit within extender 240. Cable 250 may provide a power connection between contacts 242 and receiver 300. For example, proximal ends 251a of wires can be electrically coupled to contacts 242 and distal ends 251b of wires can be electrically coupled to receiver 300. Although a single cable 250 is shown, in some embodiments, multiple cables 250 or wires could be used within extender 240.

In some embodiments, cable 250 may also provide a data connection between the control system of charging station 10 and receiver 300. For example, in FIG. 5, cable 250 is shown as having a data connector 252 at distal end 250b which can connect to a data port on receiver 300. Data connector 252 could be connected to the control system of charging station 10 in any suitable manner. For example, cable 250 could include a data cable. In other embodiments, however, the control system of charging station 10 and receiver 300 may be configured to communicate wirelessly, and in such embodiments, data connector 252 may not be needed.

FIGS. 6A-6F provide various views of receiver 300 and represent one suitable configuration of a receiver that could be used with a charging station that is configured in accordance with one or more embodiments of the present invention. Receiver 300 may include a housing 310 having an opening 311 that is vertically oriented and extends through housing 310. The top surface of housing 310 may be curved inwardly towards opening 311 such that housing 310 has a doughnut shape. A base 312 of housing 310 may be generally flat to facilitate sliding of receiver 300 along the floor.

One or more drain channels 313 may be formed in base 312 and may extend from opening 311 through the exterior wall of base 312. Drain channels 313 can enable water (or other fluids) that may enter opening 311 to flow out through base 312 rather than accumulate in opening 311. In some embodiments, a recess 318 may be formed in base 312 surrounding opening 311 to facilitate the flow of water into drain channels 313.

Receiver 300 may include a cover 320 that is configured to rotate around housing 301 to selectively expose contacts 330. For example, in FIG. 6E, cover 320 is positioned overtop contacts 330, whereas in FIG. 6F, cover 320 has been rotated to expose contacts 330. In some embodiments, cover 320 may have a semi-circular shape and may include a notch 321 that aligns with and surrounds opening 311. In some embodiments, base 312 may form a ridge 315 over which a lip 322 of cover 320 may be positioned. In some embodiments, housing 310 may include a guide channel 314 into which cover 320 inserts to thereby retain cover 320 on housing 310.

Housing 310 and cover 320 can be configured in a variety of ways to enable cover 320 to be selectively moved to expose contacts 330. For example, housing 310 and cover 320 may integrate magnets or magnetic materials, and receiver 300 may include circuitry that can selectively energize these magnets to rotate cover 320 to the desired position. In some embodiments, cover 320 may be mechanically biased into the position in which it covers contacts 330 and may be rotated in response to the creation of a magnetic field. In some embodiments, housing 310 and cover 320 may form a mechanical interface for moving cover 320. For example, a rotating arm could extend through channel 314 or ridge 315 to couple with cover 320.

Base 312 (or another portion of housing 310) can form power ports 316 and a data port 317 by which power and data are supplied to receiver 300. For example, distal ends 251b of wires (or corresponding connectors) in cable 250 could insert into power ports 316, while data connector 252 of cable 250 could insert into data port 317.

FIGS. 7A-7E provide various views of onboard unit 400 and represent one suitable configuration of an onboard unit that could be used with a charging station that is configured in accordance with one or more embodiments of the present invention. Onboard unit 400 can generally function as a mechanism for connecting EV 500's power system to receiver 300 to charge EV 500's battery, and in some embodiments, for connecting EV 500's control system to receiver 300 to enable charging station 10 and EV 500 to communicate.

Onboard unit 400 may include a cable 401 or other mechanism for connecting to EV 500's power system and a housing 402 in which a connection assembly 410 is disposed. Given that each EV may require a different mechanism for connecting to its power system, cable 401 should be viewed as representing a variety of mechanisms spanning a variety of EVs.

Connection assembly 410 includes a plug 420 having a tapered circular tip 421 on which contacts 422 are formed. Contacts 422 may correspond with contacts 330 of receiver 300, for example, in number, size, position, etc., so that they will contact each other when plug 420 is inserted into opening 311.

Plug 420 may be connected to housing 402 (or to cable 401) via a plurality of telescoping members 411-413. Although three telescoping members 411-413 are shown in the figures, any suitable number of telescoping members could be used. Telescoping members 411-413 enable plug 420 to be selectively extended from housing 402 to charge EV 500. For example, when the control system of charging station 10 has positioned receiver 300 below onboard unit 400, the control system can cause telescoping members 411-413 to extend downwardly to cause plug 420 to descend into opening 311. The control system may also cause housing 310 of receiver 300 to rotate (e.g., around base 312) to cause contacts 422 to be in alignment with contacts 330. Alternatively or additionally, the control system or circuitry of onboard unit 400 may cause plug 420 to be rotated, such as directly or via rotation of one or more of telescoping members 411-413, to cause contacts 422 to be in alignment with contacts 330.

Although not shown, in some embodiments, housing 402 may include one or more flaps that can selectively cover plug 420 when it is retracted into housing 402. For example, the flaps can be configured to open as telescoping members 411-413 are extended and to retract as telescoping members 411-413 are retracted. As another example, onboard unit 400 could include circuitry for detecting the presence of receiver 300 and could open the flaps when receiver 300 is present.

Figure 8C:
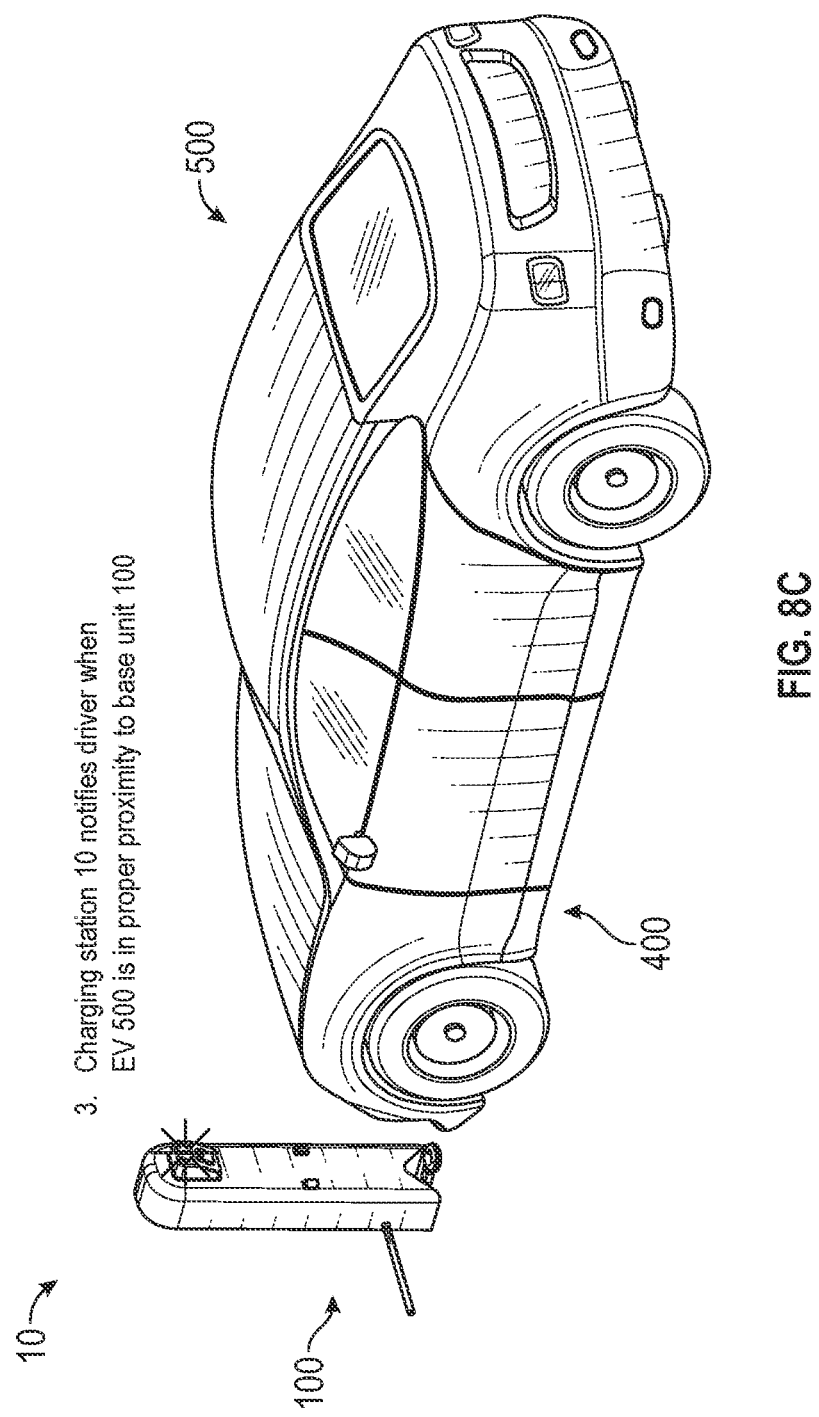

FIGS. 8A-8E provide an example of how charging station 10 can automatically connect to and charge EV 500's battery. In FIG. 8A, it is assumed that, in step 1, the control system of charging station 10 detects that EV 500 is approaching. For example, the control system of charging station 10 could employ upper sensor 113 and/or lower sensors 114 to detect the presence of EV 500, could receive a communication from onboard unit 400, could receive a communication from EV 500 or some other component or device, etc. In some embodiments, step 1 could entail identifying EV 500 or identifying the make/model of EV 500 to thereby determine where onboard unit 400 is located relative to the extents of EV 500 (e.g., on the driver side, on the passenger side, etc.).

Turning to FIG. 8B, in step 2 and based on detecting the location of EV 500 relative to base station 10 as it approaches, the control system of charging station 10 could activate visual indicators 112 as appropriate to guide the driver in positioning EV 500 in proper proximity to base unit 100. For example, if the control system detects that onboard unit 400 is on the passenger side of EV 500, it could activate visual indicators 112 to guide the driver to park EV 500 with the passenger side towards base unit 100. In this way, the control system can ensure that the driver parks EV 500 so that onboard unit 400 is within the area in which receiver 300 can be maneuvered.

Turning to FIG. 8C, it is assumed that EV 500 has reached the proper position and therefore, in step 3, the control system of charging station 10 can notify the driver that EV 500 is in proper proximity to base unit 100. For example, the control system could activate visual indicators 112 to provide visual confirmation that the driver can park EV 500.

Figure 8D:
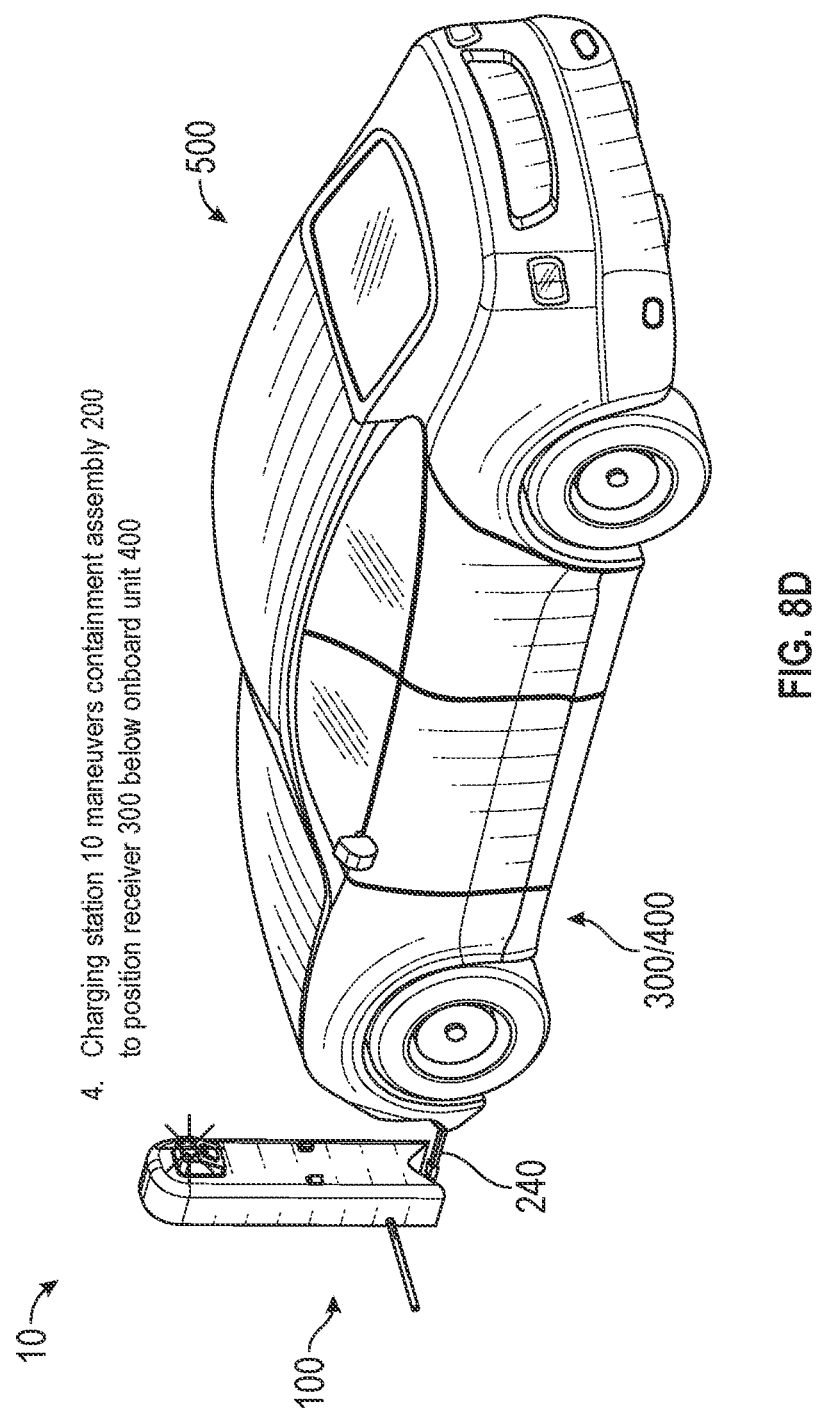

Turning to FIG. 8D, with EV 500 parked in proper proximity to base unit 100, in step 4, the control system of charging station 10 can maneuver containment assembly 200 to position receiver 300 below onboard unit 400. For example, the control system may drive motor 120 to pivot containment assembly 200 so that extender 240 is oriented towards onboard unit 400 and can drive motor 231 to extend extender 240 until receiver 300 is below onboard unit 400. In some embodiments, receiver 300 may include one or more sensors by which the control system can detect the position of onboard unit 400 relative to receiver 300 and use the detected position to perform this maneuvering.

Figure 8E:
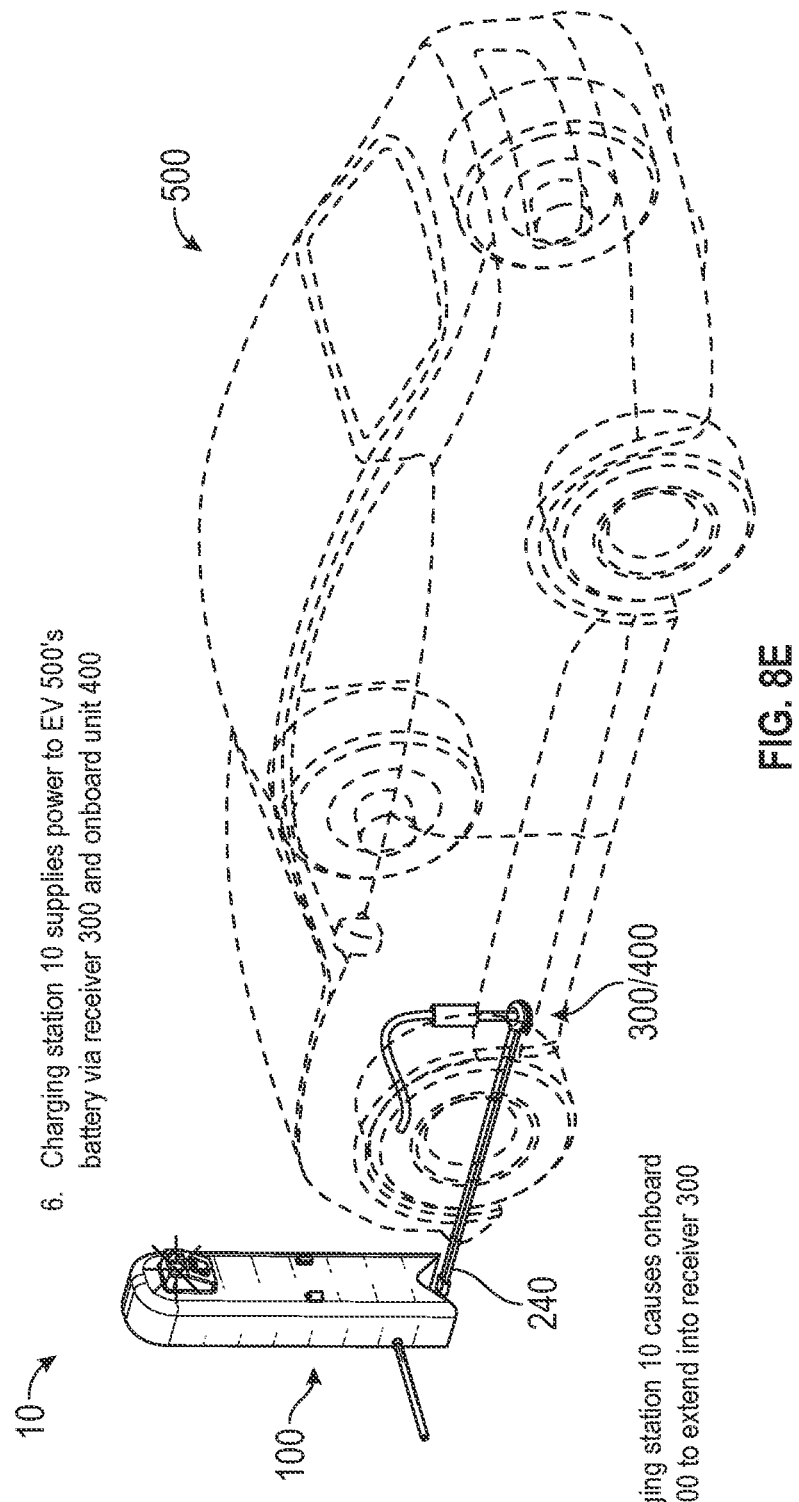

Turning to FIG. 8E, with receiver 300 positioned below onboard unit 400, the control system of charging station 10 can cause onboard unit 400 to extend plug 420 down into opening 311. Because of the rounded shape of opening 311 and the tapered tip 421 of plug 420, if there is any misalignment between receiver 300 and onboard unit 400, tapered tip 421 can pull receiver 300 into alignment as plug 420 descends into opening 311. As described above, in conjunction with causing plug 420 to descend, the control system of charging station 10 can cause cover 320 to be rotated to expose contacts 330 and may rotate housing 310 and/or plug 420 as needed to align contacts 330 with contacts 422.

Once plug 420 has been inserted into opening 311 and contacts 422 are in contact with contacts 330, in step 6, the control system of charging station 10 may supply power to EV 500's battery via receiver 300 and onboard unit 400. For example, the control system can be configured to sense when proper connection of contacts 330 and 422 has occurred and can then begin supplying power. Although power could be supplied at any time before proper connection has been made, by waiting to supply power until plug 420 is properly positioned within opening 311, accidental shock or discharge can be prevented. Also, arcing can be prevented to thereby prolong the life of plug 420 and receiver 300

Notably, after parking EV 500, the driver need not take any additional action to cause EV 500's battery to be charged. The control system of charging station 10 can automatically connect receiver 300 and onboard unit 400 and implement the charging process. Furthermore, in some embodiments, the control system of charging station 10 may be configured to communicate with EV 500's control system to autonomously drive EV 500 into the proper position relative to base unit 100. In such embodiments, no human involvement may be required at any point of the charging process.

In summary, a control system of a charging station can simplify the process of charging an EV by automatically connecting the EV's battery to a power source once the EV is parked within an area reachable by the receiver. As such, when using the charging station, the driver or autonomous functionality need not park the EV with precision. The ability of the control system to slide the receiver and the extender across the floor also allows the charging station to be used in virtually any location without any structural modifications to the floor. Accordingly, the charging station can be easily integrated into many different environments.

In some embodiments, a charging station may include more than one receiver to enable the control system to connect more than one vehicle to the charging station at any given time. For example, charging station 10 could include multiple extenders 240 to which multiple receivers 300 are connected. In such cases, the control system of charging station 10 could be configured to independently position each receiver 300 under an onboard unit 400 of multiple vehicles (e.g., vehicles parked on opposite sides of charging station 10). In some embodiments, charging station 10 could include multiple containment assemblies 200 by which the control system could independently maneuver the multiple extenders 240 and receivers 300. For example, a containment assembly 200 may be oriented to the left and another containment assembly 200 may be oriented to the right. Alternatively or additionally, a containment assembly may be oriented to the front and another containment assembly 200 may be oriented to the rear.

A charging station configured in accordance with embodiments of the present invention can also be used to provide power to a block heater of a diesel engine or to another component that may be designed to plug into an external power source. For example, a suitably-configured onboard unit could be included on or integrated into a diesel vehicle (e.g., a car, pickup, semi, bus, etc.) and electrically connected to the block heater. Then, the diesel vehicle can be parked in proper proximity to the base unit of the charging station to enable the control system to maneuver the receiver under the onboard unit and to extend the onboard unit into the receiver. In such embodiments, the control system of the charging station can be configured to supply the appropriate voltage to the receiver to power the block heater (e.g., 110 volts).

Figure 9:
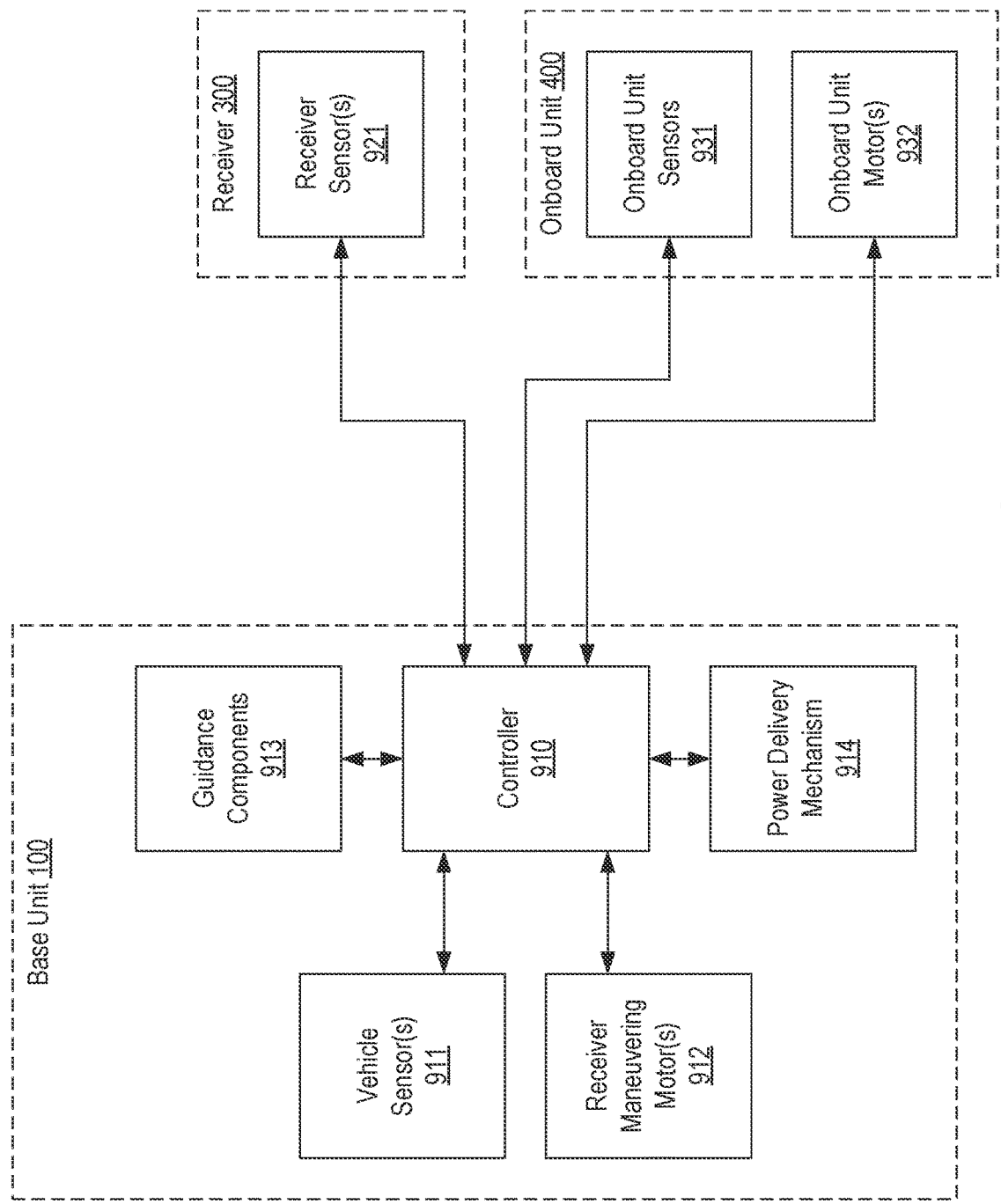
FIG. 9 is a block diagram of a control system that may be used in one or more embodiments of the present invention to control a charging station.

FIG. 9 provides an example of how a control system 900 of a charging station may be configured in accordance with one or more embodiments of the present invention. Control system 900 will primarily be described in the context of charging station 10. However, it is to be understood that control system 900, or similarly configured control systems, could be used to control the operation of other charging stations or power delivery solutions.

Control system 900 may include a controller 910 that may typically be located in base unit 100 of charging station 10. Controller 910 can represent any suitable combination of hardware and/or software for controlling the operation of charging station 10 such as, but not limited to, one or more central processing units, microprocessors, microcontrollers, field programming gate arrays, application-specific integrated circuits, systems on a chip, etc. In some embodiments, a controller could also be included on receiver 300 and/or on onboard unit 400 to assist controller 910 in performing the functionality described herein. Accordingly, embodiments of the present invention should not be limited to any particular configuration or arrangement of any controller(s).

Control system 900 may also include other components that may typically be located on base unit 100 of charging station 10 such as one or more vehicle sensors 911, one or more receiver maneuvering motors 912, one or more guidance components 913 and a power delivery mechanism 914. Vehicle sensors 911 can include any sensors that are configured to detect the position of a vehicle relative to a base unit of a charging station. For example, vehicle sensors 911 could include upper sensor 113 and lower sensors 114 that are incorporated into base unit 100 of charging station 10. In some embodiments, vehicle sensors 911 may also represent one or more cameras which may be used to capture images of an approaching vehicle. Receiver maneuvering motors 912 can represent any motors that are configured to maneuver a receiver of a charging station towards an onboard unit. For example, receiver maneuvering motors 912 could include motor 120 and motor 231. Guidance components 913 can represent any component by which controller 910 provides guidance to a driver of a vehicle. For example, guidance components 913 could include visual indicators 112. Power delivery mechanism 914 can represent any component that is configured to selectively deliver power to a receiver of a charging station. For example, power delivery mechanism 914 could be a switch.

Control system 900 may include components that are located on a receiver of a charging station such as one or more receiver sensors 921. Receiver sensors 921 can represent any type of sensor that may be used to detect a position of a receiver relative to an onboard unit. For example, U.S. patent application Ser. No. 17/369,615, which is incorporated herein by reference, describes various examples of receivers that include sensors. Receiver sensors 921 may be configured to communicate with controller 910, whether directly or through another controller, to thereby report sensor readings indicative of the receiver's position relative to the onboard unit.

In some embodiments, receiver sensors 921 could represent any type of sensor capable of detecting the presence or likelihood of snow or ice on the receiver (e.g., a thermometer). Such a sensor could also be incorporated into base unit 100 of charging station 10 or at any other location. In any case, controller 910 could be configured to activate a heating element on the receiver to melt any snow or ice that may be present based on readings received from such a sensor. In other embodiments, controller 910 could be configured to activate the heating element independent of any sensor readings (e.g., each time the receiver is deployed).

Control system 900 may include components that are located on an onboard unit that is configured for use with a charging station. Such components may include one or more onboard unit sensors 931 and one or more onboard unit motors 932. Onboard unit sensors 931 can represent any type of sensor that may be used to detect a position of an onboard unit relative to a receiver. For example, U.S. patent application Ser. No. 17/377,041, which is incorporated herein by reference, describes embodiments of an onboard unit that may be used with charging station 10 and that may include onboard unit sensors 931 on its enclosure or other component. Onboard unit sensors 931 may be configured to communicate with controller 910, whether directly or through another controller, to thereby report sensor readings indicative of the onboard unit's position relative to the receiver. Onboard unit motors 932 can represent any motor that may be used to extend and retract an onboard unit such as the motor described in U.S. patent application Ser. No. 17/377,041. Controller 910 may be configured to communicate with onboard unit motors 932, whether directly or through another controller, to thereby control when and how onboard unit motors 932 are driven.

Figure 10:
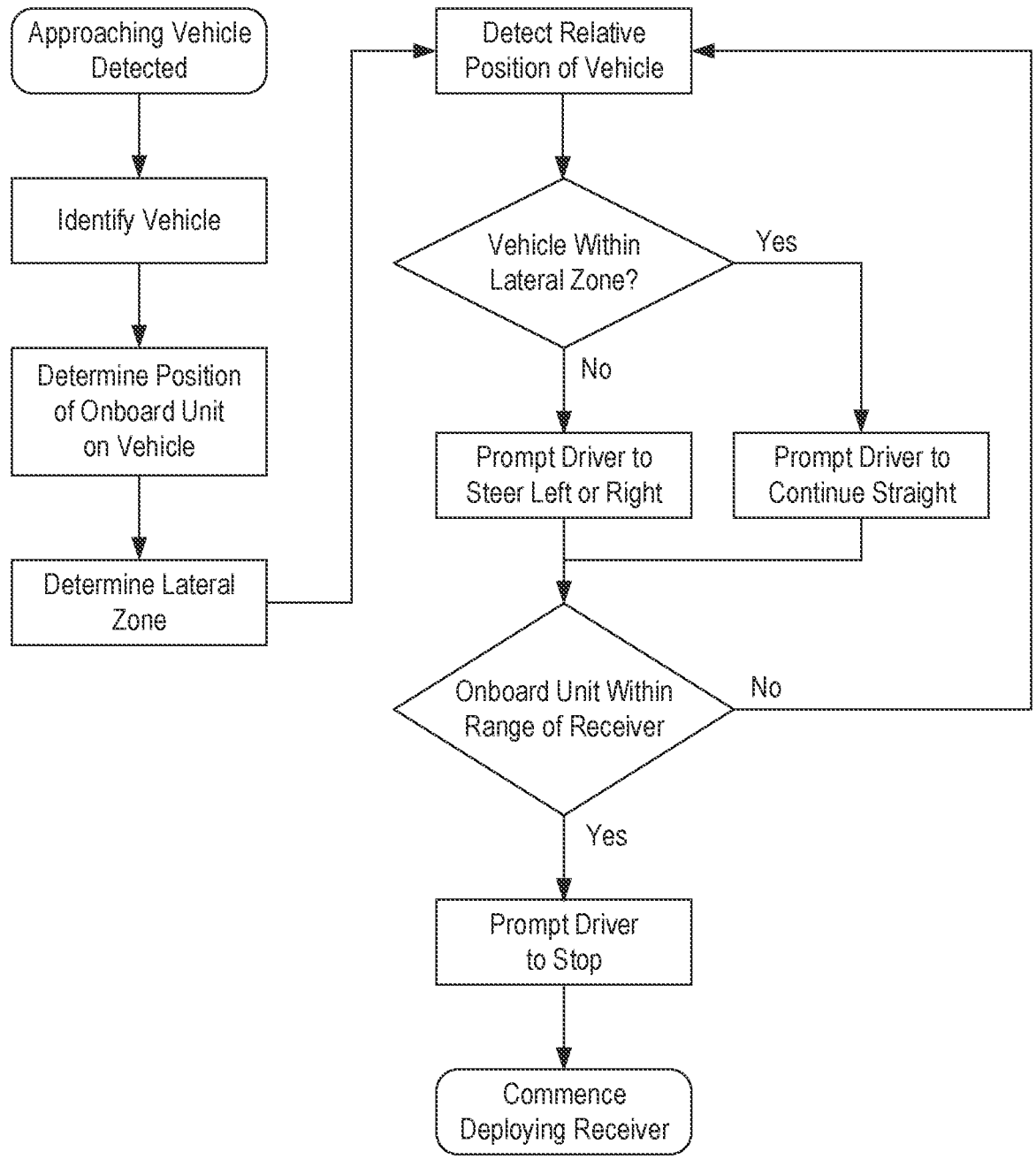
FIG. 10 is a flowchart of an example process by which the control system of a charging station can ensure that a vehicle is parked in proper proximity to the charging station.

FIG. 10 is a flowchart of a process controller 910 may perform as a vehicle is approaching base unit 100 to ensure that the vehicle is parked within range of receiver 300. This process commences when controller 910 detects that a vehicle is approaching. For example, controller 910 could receive one or more signals from vehicle sensors 911 indicative of the presence of a vehicle near base unit 100. In some embodiments, controller 910 may identify the approaching vehicle or at least a type of the approaching vehicle. For example, controller 910 may use a camera to capture one or more images of the approaching vehicle and use image processing techniques to identify the make and model of the vehicle (e.g., by comparing the captured images to images of known makes and models). As another example, controller 910 could be configured to obtain an identifier of the vehicle. For example, the vehicle could be configured to passively or actively transmit an identifier when it is within proximity of charging station 10.

By identifying the approaching vehicle, controller 910 may determine the position of onboard unit 400 on the approaching vehicle. For example, a particular make and model of vehicle may require onboard unit 400 to be positioned in a particular location underneath the vehicle. Therefore, by detecting the make and model, controller 910 may know where onboard unit 400 is located relative to the vehicle's extents (e.g., as an x, y offset). Alternatively, in some embodiments, the position of onboard unit 400 may be stored for each individual vehicle with which charging station 10 may be used. In any case, controller 910 may maintain or otherwise have access to a database which maps a particular vehicle or type of vehicle to the position of onboard unit 400 on the vehicle. The following tables provide examples of how such mappings could be defined.

| Make and Model | Onboard Unit Position |
| --- | --- |
| Tesla Model S | $(X_1, Y_1)$ |
| Porsche Taycan 4S | $(X_2, Y_2)$ |
| ... | ... |

| Vehicle Identifier | Onboard Unit Position |
| --- | --- |
| VehicleID1 | $(X_1, Y_1)$ |
| VehicleID2 | $(X_2, Y_2)$ |
| ... | ... |

By determining the position of onboard unit 400 on the vehicle, controller 910 can determine whether the vehicle's lateral position relative to base unit 100 as it approaches base unit 100 will cause onboard unit 400 to be within reach of receiver 300. In other words, controller 910 can use the position of onboard unit 400 to ensure that the driver does not park the vehicle too far to the right or left of base unit 100. To accomplish this in some embodiments, controller 910 may determine a lateral zone for the approaching vehicle where the width and position of the lateral zone relative to base unit 100 is dictated by the position on onboard unit 400. This lateral zone could define the side-to-side zone in front of base unit 100 within which the vehicle should remain as it approaches base unit 100 to ensure that onboard unit 400 will be within reach of receiver 300.

Figure 11:
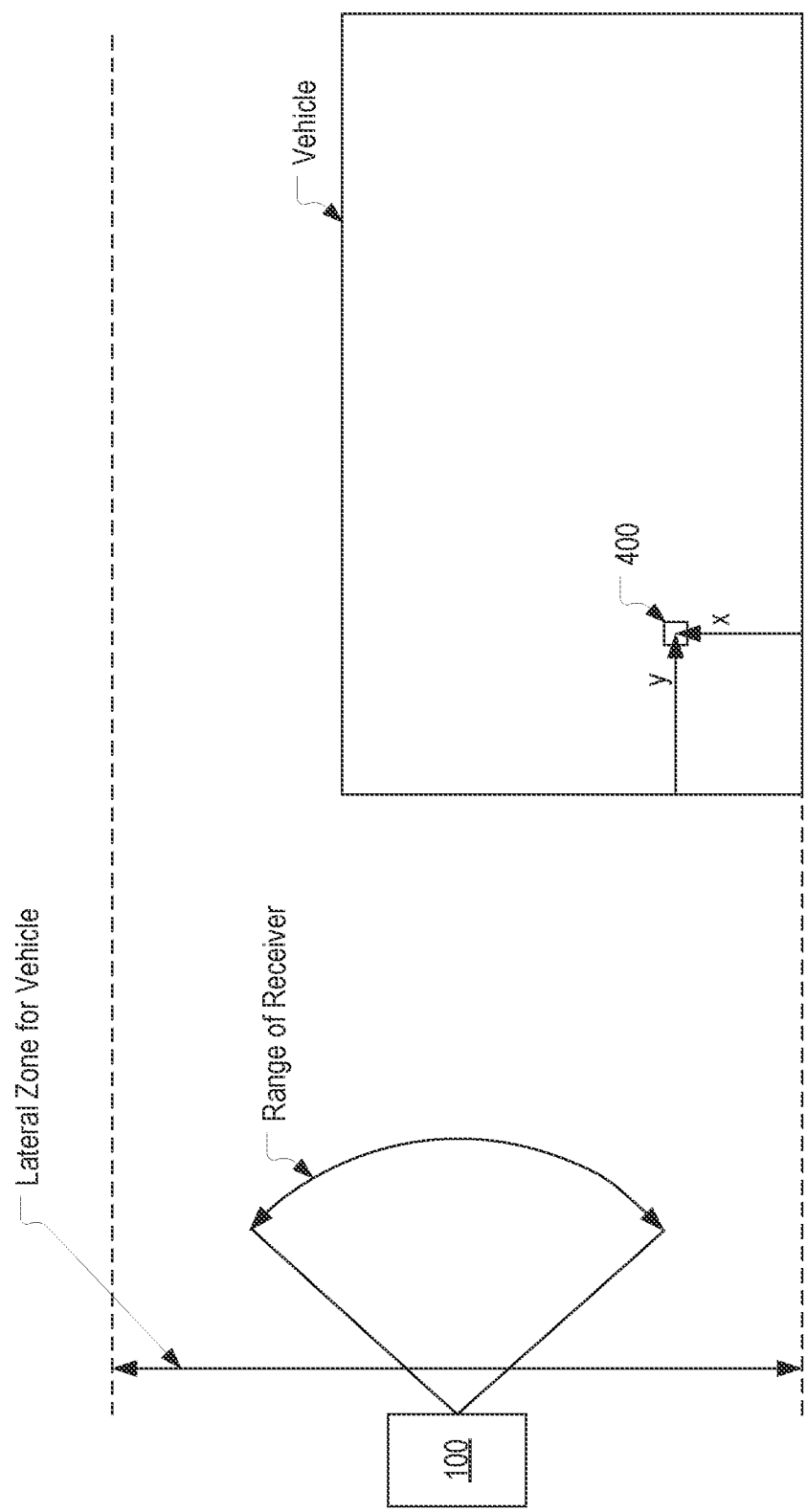
FIG. 11 provides an example of how the control system can determine if an approaching vehicle is positioned within a lateral zone relative to the charging station.

FIG. 11 provides an example of how a lateral zone may be determined for a particular vehicle. As shown, onboard unit 400 is positioned at an x offset from the driver side and at a y offset from the front of the vehicle. Using these offsets and the known range of receiver 300, controller 910 can calculate the lateral zone for the vehicle—i.e., the zone within which the sides of the vehicle should remain as the vehicle approaches base unit 100 to ensure that onboard unit 400 will pass into the range of receiver 300.

Once controller 910 has determined the position of onboard unit 400 on the approaching vehicle and used it to determine the lateral zone for the vehicle, controller 910 can commence providing guidance to the driver of the vehicle to ensure that he or she parks the vehicle in the proper location. As represented in FIG. 10, controller 910 can iteratively detect the position of the vehicle relative to base unit 100 such as by processing signals received from vehicle sensors 911. As it detects the current position of the vehicle, controller 910 can determine whether the vehicle is within the lateral zone. If so, controller 910 can prompt the driver to continue approaching in a straight direction (e.g., via guidance components 913). If not, controller 910 can prompt the driver to steer to the left or right as appropriate (e.g., via guidance components 913). Additionally, controller 910 can determine whether onboard unit 400 is within range of receiver 300. If not, controller 910 can continue detected the vehicle's position and providing appropriate guidance. If so, controller 910 can prompt the user to stop the vehicle (e.g., via guidance components 913) and transition to performing a process to deploy receiver 300.

Although not shown, in some embodiments, the driver may not approach base unit 100 within the lateral zone, may park too close to base unit 100 or may otherwise park the vehicle so that onboard unit 400 is not within range of receiver 300. In such cases, controller 910 could prompt the driver to back up the vehicle and reapproach base unit 100.

FIG. 10 represents functionality that controller 910 may perform when a human is driving the vehicle. In embodiments where the vehicle's control system is configured to communicate with controller 910, controller 910 could provide control signals to the vehicle's control system to cause the vehicle to be autonomously parked in the appropriate position relative to base unit 100.

Figure 12:
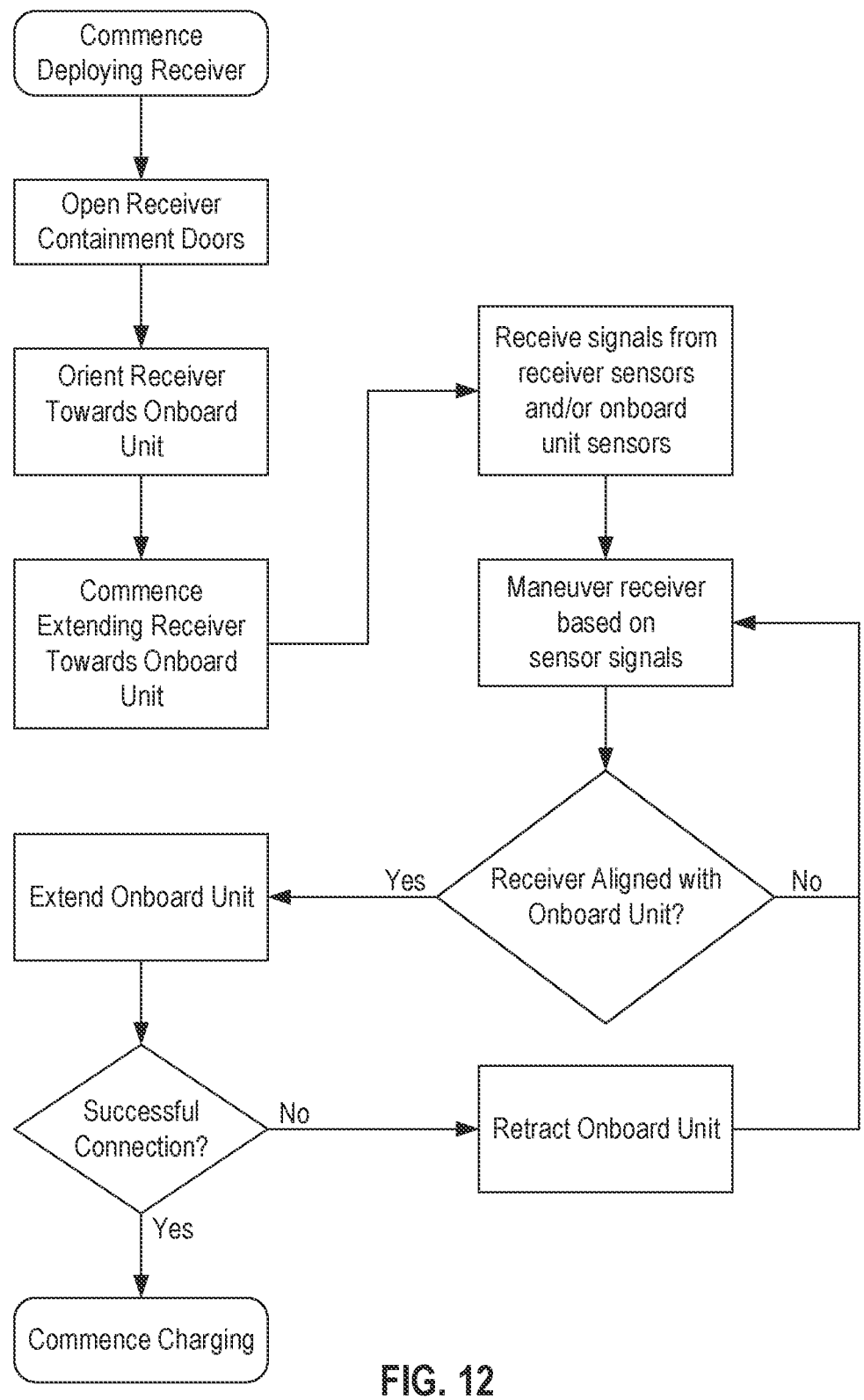
FIG. 12 is a flowchart of an example process by which the control system can maneuver a receiver as part of automatically connecting the receiver to a vehicle's onboard unit.

FIG. 12 is a flowchart of a process controller 910 may perform to deploy receiver 300. In some embodiments, controller 910 may deploy receiver 300 after performing the process represented in FIG. 10 to ensure that the vehicle is parked in an appropriate position relative to base unit 100. However, controller 900 could deploy receiver 300 at any suitable time.

In some embodiments, controller 910 may open any receiver container doors (or protective coverings) that may be included on base unit 100. In other words, in some embodiments, base unit 100 may be configured with receiver containment doors that are closed when receiver 300 is not extended from base unit 100 to thereby secure the interior of base unit 100. In some embodiments, such doors may also be closed when receiver 300 is extended but is not being maneuvered.

Initially, controller 910 can drive one or more of receiver maneuvering motors 912 to orient receiver 300 towards onboard unit 400 such as by using the determined position of onboard unit 400 on the vehicle and the current position of the vehicle relative to base unit 100. For example, controller 910 may drive motor 120 to rotate containment assembly 200 until it is oriented towards the presumed location of onboard unit 400. Controller 910 can also drive one or more of receiver maneuvering motors 912 to commence extending receiver 300 towards the presumed location of onboard unit 400. For example, controller 910 may drive motor 231 to cause extender 240 and therefore receiver 300 to extend from base unit 100.

As receiver 300 is being maneuvered towards the presumed location of onboard unit 400, controller 910 can receive signals from receiver sensors 921 and/or onboard unit sensors 931. Such signals could be indicative of the position of receiver 300 relative to onboard unit 400. Controller 910 can therefore maneuver receiver 300 based on the signals it receives from receiver sensors 921 and/or onboard unit sensors 931 to attempt to position receiver 300 in alignment with (i.e., directly beneath) onboard unit 400. As it performs this maneuvering, controller 910 can determine whether receiver 300 is in alignment with onboard unit 400 and continue the process until it is in alignment. Once receiver 300 is in alignment, controller 910 can cease maneuvering receiver 300 and cause onboard unit 400 to be extended. For example, controller 910 may communicate with onboard unit motor(s) 932 to cause it/them to extend onboard unit 400 downwardly towards receiver 400 such as is described in U.S. patent application Ser. No. 17/377,041.

After causing onboard unit 400 to extend, controller 910 can determine whether an electrical connection has been successfully established between receiver 300 and onboard unit 400. For example, controller 910 can sense whether each electrical contact on receiver 300 and the corresponding electrical contact on onboard unit are in contact. If not, controller 910 may cause onboard unit 400 to be retracted and may recommence maneuvering receiver 300 to attempt to align it with onboard unit 400. In contrast, if an electrical connection has been successfully established, controller 910 can commence charging the vehicle. For example, controller 910 can interface with power delivery mechanism 914 to cause power to be delivered to onboard unit 400 via receiver 300. Although not shown, controller 910 may also commence communicating with the vehicle via any data connection that may be established using receiver 300 and onboard unit 400.

Once the charging process is complete (e.g., when controller 910 detects that the vehicle's battery is fully charged) or when controller 910 otherwise determines that receiver 300 and onboard unit 400 should be disconnected, controller 910 may perform a generally reverse process by ceasing to provide power to receiver 300, retracting onboard unit 400, retracting receiver 300 into base unit 100 and closing any receiver containment doors. In some embodiments, controller 910 may use vehicle sensors 911 while retracting receiver 300 to detect if any obstacles are present. If so, controller 910 may maneuver receiver 300 around any obstacle.

Although the above-described processes have been described in the context of charging a vehicle, they can equally be performed to connect an onboard unit to a receiver for other purposes. For example, the above-described processes could be performed to provide power to a block heater of a diesel engine or to another component that may be designed to plug into an external power source.

In summary, a control system of a charging station can be configured to assist a driver in parking a vehicle in a proper location relative to a base unit of the charging station. The control system may also be configured to automatically maneuver a receiver beneath an onboard unit and to extend the onboard unit to establish an electrical connection. In this way, a vehicle can be automatically and intelligently connected to the charging station.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:
1. A method for connecting a vehicle to a charging station, the method comprising:
    detecting a vehicle adjacent to a base unit of the charging station;

extending a receiver from the base unit beneath the vehicle, the receiver comprising a housing having an upward-facing opening that extends through the housing, the receiver further comprising a plurality of fixed contacts that are formed within the upward-facing opening, positioned below an upper surface of the housing, and oriented inwardly;

maneuvering the receiver beneath the vehicle towards a presumed location of an onboard unit on the vehicle;

while maneuvering the receiver towards the presumed location of the onboard unit, receiving signals from one or more sensors representing a position of the receiver relative to the onboard unit;

maneuvering the receiver based on the signals to position the receiver in alignment with the onboard unit;

in conjunction with positioning the receiver in alignment with the onboard unit, causing the onboard unit to be extended downwardly from the vehicle and into the upward-facing opening in the housing of the receiver such that a bottom portion of the onboard unit is positioned below the upper surface the housing to thereby establish an electrical connection between the plurality of fixed contacts that are formed within the upward-facing opening, positioned below the upper surface of the housing, and oriented inwardly and a corresponding plurality of contacts that are formed on the bottom portion of the onboard unit and are oriented outwardly.

2. The method of claim 1, wherein maneuvering the receiver beneath the vehicle comprises maneuvering the receiver along a ground surface.

3. The method of claim 1, wherein the one or more sensors are on the receiver.

4. The method of claim 1, wherein the one or more sensors are on the onboard unit.

5. The method of claim 1, wherein the presumed location is determined based on a type of the vehicle.

6. The method of claim 1, wherein the type of the vehicle is a make and model of the vehicle.

7. The method of claim 6, further comprising:
determining the make and model of the vehicle by capturing one or more images of the vehicle.

8. The method of claim 1, wherein maneuvering the receiver towards the presumed location of the onboard unit comprises orienting the receiver towards the presumed location and extending the receiver towards the presumed location.

9. The method of claim 1, further comprising:
in response to determining that the electrical connection has been established, commencing delivery of power to the onboard unit via the receiver.

10. The method of claim 1, further comprising:
while the vehicle is approaching the charging station, providing guidance to a driver of the vehicle based on the position of the onboard unit on the vehicle and a position of the vehicle relative to the charging station.

11. The method of claim 10, further comprising:
determining that the position of the vehicle relative to the charging station causes the onboard unit to be within range of the receiver; and
providing guidance to the driver to park the vehicle.

12. The method of claim 1, further comprising:
causing the onboard unit to be retracted; and
retracting the receiver into the charging station.

13. The method of claim 1, further comprising:
determining that the electrical connection has not been established;
causing the onboard unit to be retracted; and
again maneuvering the receiver beneath the vehicle to attempt to align the receiver with the onboard unit.

14. The method of claim 1, further comprising:
activating a heating element on the receiver to melt any snow or ice that may be present.

15. The method of claim 14, wherein the heating element is activated based on readings received from one or more sensors on the receiver or the base unit.

16. A method for connecting a vehicle to a charging station, the method comprising:
detecting that a vehicle is approaching the charging station;
determining a position of an onboard unit on the vehicle;
providing guidance to a driver of the vehicle based on the position of the onboard unit on the vehicle and a position of the vehicle relative to the charging station;
extending a receiver from a base unit of the charging station and underneath the vehicle, the receiver comprising a housing having an upward-facing opening that extends through the housing, the receiver further comprising a plurality of fixed contacts that are formed within the upward-facing opening, positioned below an upper surface of the housing, and oriented inwardly;
maneuvering the receiver underneath the vehicle based on the position of the onboard unit on the vehicle;
in conjunction with positioning the receiver in alignment with the onboard unit, causing the onboard unit to be extended downwardly from the vehicle and into the upward-facing opening in the housing of the receiver such that a bottom portion of the onboard unit is positioned below the upper surface of the housing to thereby establish an electrical connection between the plurality of fixed contacts that are formed within the upward-facing opening, positioned below the upper surface of the housing, and oriented inwardly and a corresponding plurality of contacts that are formed on the bottom portion of the onboard unit and are oriented outwardly.

17. The method of claim 16, wherein maneuvering the receiver beneath the vehicle towards the position of the onboard unit comprises:
while maneuvering the receiver underneath the vehicle based on the position of the onboard unit on the vehicle, receiving signals from one or more sensors representing a position of the receiver relative to the onboard unit; and
maneuvering the receiver based on the signals to position the receiver in alignment with the onboard unit.

18. The method of claim 17, wherein the onboard unit extends via a telescoping mechanism.

19. The method of claim 18, further comprising:
commencing delivery of power to the receiver after determining that the electrical connection is established.

20. The method of claim 16, further comprising:
activating a heating element on the receiver to melt any snow or ice that may be present.

21. A method for connecting a vehicle to a charging station, the method comprising:
detecting a type of an approaching vehicle;
based on the detected type, determining a position of an onboard unit on the vehicle;
providing guidance to a driver of the vehicle based on the determined position of the onboard unit to thereby assist the driver in parking the vehicle with the onboard unit within range of a receiver, the receiver comprising a housing having an upward-facing opening that extends through the housing, the receiver further comprising a plurality of fixed contacts that are formed within the upward-facing opening, positioned below an upper surface of the housing, and oriented inwardly;

extending the receiver from a base unit of the charging station and underneath the vehicle;

initially maneuvering the receiver based on the determined position of the onboard unit on the vehicle;

subsequently maneuvering the receiver based on signals received from one or more sensors that represent a position of the receiver relative to the onboard unit;

determining that the receiver is aligned with the onboard unit; and causing the onboard unit to be extended into the upward-facing opening in the housing of the receiver such that a bottom portion of the onboard unit is positioned below the upper surface of the housing to thereby establish an electrical connection between the plurality of fixed contacts that are formed within the upward-facing opening, positioned below the upper surface of the housing, and oriented inwardly and a corresponding plurality of contacts that are formed on the bottom portion of the onboard unit and are oriented outwardly.

22. The method of claim 21, wherein the receiver is slid along a ground surface.

23. The method of claim 21, further comprising:

activating a heating element on the receiver to melt any snow or ice that may be present.

* * * * *